(12) United States Patent
Ikeda et al.

(10) Patent No.: US 9,554,087 B2
(45) Date of Patent: Jan. 24, 2017

(54) INFORMATION PROCESSING DEVICE INCLUDING AN IMAGE TRANSMISSION CONTROL FUNCTION

(71) Applicant: FUJITSU LIMITED, Kawasaki-shi, Kanagawa (JP)

(72) Inventors: Hitoshi Ikeda, Saitama (JP); Yosuke Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 267 days.

(21) Appl. No.: 13/974,554

(22) Filed: Aug. 23, 2013

(65) Prior Publication Data

US 2013/0342633 A1 Dec. 26, 2013

Related U.S. Application Data

(63) Continuation of application No. PCT/JP2011/057987, filed on Mar. 30, 2011.

(51) Int. Cl.
*H04N 7/14* (2006.01)
*H04N 5/232* (2006.01)

(52) U.S. Cl.
CPC .......... *H04N 7/141* (2013.01); *H04N 5/23219* (2013.01); *H04N 7/142* (2013.01); *H04N 7/147* (2013.01); *H04N 2007/145* (2013.01)

(58) Field of Classification Search
USPC ................................................ 348/14.02
See application file for complete search history.

(56) References Cited

U.S. PATENT DOCUMENTS

| 7,564,476 B1* | 7/2009 | Coughlan | H04N 7/147 348/14.01 |
| 2006/0050141 A1* | 3/2006 | Yoshimura | 348/14.02 |
| 2007/0003254 A1 | 1/2007 | Honobe | |
| 2010/0097440 A1* | 4/2010 | Lee | H04N 7/147 348/14.02 |

FOREIGN PATENT DOCUMENTS

| EP | 1631084 | 3/2006 |
| JP | 2006-067436 A | 3/2006 |
| JP | 2006-253775 | 9/2006 |
| JP | 2007-013693 A | 1/2007 |
| JP | 2008-182466 A | 8/2008 |

(Continued)

OTHER PUBLICATIONS

The extended European search report of European Patent Application No. 11862357.8 dated Feb. 27, 2015.

(Continued)

*Primary Examiner* — Amal Zenati
(74) *Attorney, Agent, or Firm* — Maschoff Brennan

(57) ABSTRACT

An information processing device including an image transmission control function includes an image pickup unit that picks up an image including a facial image of a speaker; a transmission unit that transmits a picked-up image; a reception unit that receives an image including a facial image picked up by a communication counterpart device; a display unit that displays a received image; and a transmission control unit that inhibits transmission of the image picked up by the image pickup unit in a case where the facial image is not being picked up by the communication counterpart device.

4 Claims, 22 Drawing Sheets

(56) References Cited

FOREIGN PATENT DOCUMENTS

JP   2009-004959 A   1/2009
JP   2009-060277 A   3/2009

OTHER PUBLICATIONS

International Search Report dated Jun. 7, 2011 in application No. PCT/JP2011/057987.
International Preliminary Report on Patentability dated Oct. 10, 2013 in application No. PCT/JP2011/057987.
Notice of Reason for Rejection mailed May 27, 2014 issued in corresponding Japanese Patent Application No. 2013-506939.

* cited by examiner

FIG. 3A

| No. | MT(A) A-SIDE TERMINAL | | | DIRECTION | MT(B) B-SIDE TERMINAL | | |
|---|---|---|---|---|---|---|---|
| | CAMERA | LCD | PROCESSING | | PROCESSING | LCD | CAMERA |
| 1 | PHOTOGRAPH A'S FACE | DISPLAY B'S FACE | TRANSMIT MOVING IMAGE | → | RECEIVE MOVING IMAGE | DISPLAY A'S FACE | PHOTOGRAPH B'S FACE |
| | | | RECEIVE MOVING IMAGE | ← | TRANSMIT MOVING IMAGE | | |
| 2 | PHOTOGRAPH FLOWER | STOP DISPLAY | TRANSMIT MOVING IMAGE | → | RECEIVE MOVING IMAGE | DISPLAY FLOWER | PHOTOGRAPH B'S FACE |
| | | | A'S FACE RECOGNITION NG INHIBITION msg | | STOP TRANSMISSION | | |
| 3 | PHOTOGRAPH A'S FACE | DISPLAY B'S FACE | TRANSMIT MOVING IMAGE | → | RECEIVE MOVING IMAGE | DISPLAY A'S FACE | PHOTOGRAPH B'S FACE |
| | | | A'S FACE RECOGNITION OK INHIBITION CANCELLING msg | | | | |
| | | | RECEIVE MOVING IMAGE | ← | TRANSMIT MOVING IMAGE | | |

FIG. 3B

| No. | MT(A) A-SIDE TERMINAL | | | DIREC-TION | MT(B) B-SIDE TERMINAL | | |
|---|---|---|---|---|---|---|---|
| | CAMERA | LCD | PROCESSING | | PROCESSING | LCD | CAMERA |
| 4 | PHOTOGRAPH A'S FACE | DISPLAY AUTOMOBILE | RECEIVE MOVING IMAGE | ↓ | TRANSMIT MOVING IMAGE | STOP DISPLAY | PHOTOGRAPH AUTOMOBILE |
| | | | STOP TRANSMISSION | | B'S FACE RECOGNITION NG INHIBITION msg | | |
| 5 | PHOTOGRAPH FLOWER | STOP DISPLAY | A'S FACE RECOGNITION NG INHIBITION msg | ↓ | | STOP DISPLAY | PHOTOGRAPH AUTOMOBILE |
| | | | | ↑ | STOP TRANSMISSION | | |
| 6 | PHOTOGRAPH FLOWER | STOP DISPLAY | TRANSMIT MOVING IMAGE | ↓ | B'S FACE RECOGNITION OK INHIBITION CANCELLING msg | DISPLAY FLOWER | PHOTOGRAPH B'S FACE |
| | | | | ↑ | RECEIVE MOVING IMAGE | | |

FIG. 6A

| No. | MT(A) A-SIDE TERMINAL | | | DIRECTION | MT(B) B-SIDE TERMINAL | | |
|---|---|---|---|---|---|---|---|
| | CAMERA | LCD | PROCESSING | | PROCESSING | LCD | CAMERA |
| 1 | PHOTOGRAPH A'S FACE | DISPLAY B'S FACE | TRANSMIT MOVING IMAGE | → | RECEIVE MOVING IMAGE | DISPLAY A'S FACE | PHOTOGRAPH B'S FACE |
| | | | RECEIVE MOVING IMAGE | ← | TRANSMIT MOVING IMAGE | | |
| 2 | PHOTOGRAPH FLOWER | STOP DISPLAY | TRANSMIT MOVING IMAGE | → | RECEIVE MOVING IMAGE A'S FACE RECOGNITION NG STOP TRANSMISSION | DISPLAY FLOWER | PHOTOGRAPH B'S FACE |
| 3 | PHOTOGRAPH A'S FACE | DISPLAY B'S FACE | TRANSMIT MOVING IMAGE | → | RECEIVE MOVING IMAGE A'S FACE RECOGNITION OK TRANSMIT MOVING IMAGE | DISPLAY A'S FACE | PHOTOGRAPH B'S FACE |
| | | | RECEIVE MOVING IMAGE | ← | | | |

FIG. 6B

| No. | MT(A) A-SIDE TERMINAL | | | DIREC-TION | MT(B) B-SIDE TERMINAL | | |
|---|---|---|---|---|---|---|---|
| | CAMERA | LCD | PROCESSING | | PROCESSING | LCD | CAMERA |
| 4 | PHOTOGRAPH A'S FACE | DISPLAY AUTOMOBILE  | RECEIVE MOVING IMAGE | ↓ | TRANSMIT MOVING IMAGE | STOP DISPLAY | PHOTOGRAPH AUTOMOBILE 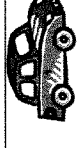 |
| 5 | PHOTOGRAPH FLOWER | STOP DISPLAY | B'S FACE RECOGNITION NG STOP TRANSMISSION A'S FACE RECOGNITION NG BEARER SWITCHING | | | STOP DISPLAY | PHOTOGRAPH AUTOMOBILE |
| 6 | STOP CAMERA | STOP DISPLAY | VOICE-CALL-IN-PROGRESS STATE | | | STOP DISPLAY | STOP CAMERA |

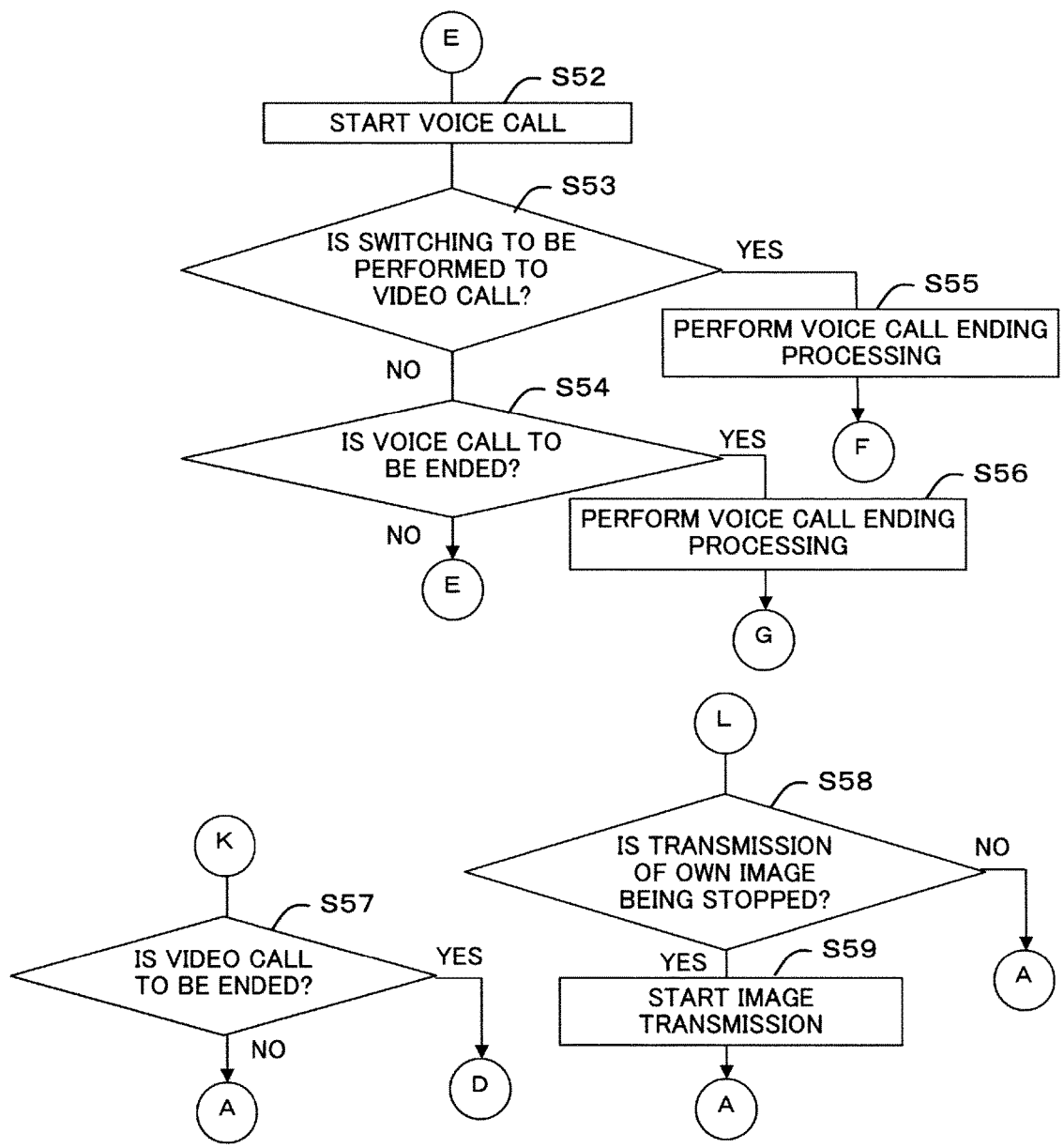

FIG. 9

| No. | MT(A) A-SIDE TERMINAL | | | DIREC-TION | MT(B) B-SIDE TERMINAL | | |
|---|---|---|---|---|---|---|---|
| | CAMERA | LCD | PROCESSING | | PROCESSING | LCD | CAMERA |
| 1 | PHOTOGRAPH A'S FACE | DISPLAY B'S FACE | [2] TRANSMIT MOVING IMAGE [2] RECEIVE MOVING IMAGE | → ← | [2] RECEIVE MOVING IMAGE [2] TRANSMIT MOVING IMAGE | DISPLAY A'S FACE | PHOTOGRAPH B'S FACE |
| 2 | PHOTOGRAPH A'S FACE | DISPLAY AUTOMOBILE | RECEIVE MOVING IMAGE B'S FACE RECOGNITION NG [3] STOP TRANSMISSION | ← | TRANSMIT MOVING IMAGE [1] | STOP DISPLAY | PHOTOGRAPH AUTOMOBILE |
| 3 | PHOTOGRAPH FLOWER | STOP DISPLAY | A'S FACE RECOGNITION NG | | | STOP DISPLAY | PHOTOGRAPH AUTOMOBILE |
| 4 | STOP CAMERA | STOP DISPLAY | [4] VOICE-CALL-IN-PROGRESS STATE | | [*] BEARER SWITCHING [*] VOICE-CALL-IN-PROGRESS STATE | STOP DISPLAY | STOP CAMERA |

FIG. 10

| No. | MT(A) A-SIDE TERMINAL | | | DIREC-TION | MT(B) B-SIDE TERMINAL | | |
|---|---|---|---|---|---|---|---|
| | CAMERA | LCD | PROCESSING | | PROCESSING | LCD | CAMERA |
| 1 | PHOTOGRAPH A'S FACE | DISPLAY B'S FACE | [2] TRANSMIT MOVING IMAGE [2] RECEIVE MOVING IMAGE | ↑ ↓ | RECEIVE MOVING IMAGE TRANSMIT MOVING IMAGE | DISPLAY A'S FACE | PHOTOGRAPH B'S FACE |
| 2 | PHOTOGRAPH FLOWER | DISPLAY B'S FACE | [2] TRANSMIT MOVING IMAGE [2] RECEIVE MOVING IMAGE | ↑ ↓ | RECEIVE MOVING IMAGE TRANSMIT MOVING IMAGE | DISPLAY FLOWER | PHOTOGRAPH B'S FACE |
| 3 | PHOTOGRAPH FLOWER | DISPLAY AUTOMOBILE | RECEIVE MOVING IMAGE B'S FACE RECOGNITION NG [3] STOP TRANSMISSION | ↓ | TRANSMIT MOVING IMAGE | STOP DISPLAY | PHOTOGRAPH AUTOMOBILE |
| 4 | PHOTOGRAPH FLOWER | STOP DISPLAY | A'S FACE RECOGNITION NG [*] BEARER SWITCHING | | | STOP DISPLAY | PHOTOGRAPH AUTOMOBILE |
| 5 | STOP CAMERA | STOP DISPLAY | [4] VOICE-CALL-IN-PROGRESS STATE | | | STOP DISPLAY | STOP CAMERA | ar
INFORMATION PROCESSING DEVICE INCLUDING AN IMAGE TRANSMISSION CONTROL FUNCTION

CROSS-REFERENCE TO RELATED APPLICATION

This is a continuation of application PCT/JP2011/057987, filed on Mar. 30, 2011, now pending, the contents of which are herein wholly incorporated by reference.

FIELD

The disclosures made herein relate to an information processing device including an image transmission control function.

BACKGROUND

In recent years, a mobile phone terminal including a video call function has been widespread as an example of an information processing device that transmits/receives a facial image.

This video call function allows voice information and image information, which is obtained through real-time photographing (image pickup) with a camera, to be transmitted/received bidirectionally between a mobile phone terminal used by a calling party and a mobile phone terminal used by a called party. As a result, it is possible to visually grasp a situation of a communication counterpart, which is insufficient with only voice. However, a broad transmission bandwidth is necessary for a communication path including a network due to the bidirectional transmission/reception of the image information.

The following are related arts to the invention.
[Patent document 1] Japanese Patent Laid-Open Publication No. JP 2009-4959
[Patent document 2] Japanese Patent Laid-Open Publication No. JP 2009-60277

SUMMARY

In a case where a video call is performed between a mobile phone terminal used by a calling party and a mobile phone terminal used by a called party, image information photographed with a camera of the mobile phone terminal used by the called party is displayed on a display of the mobile phone terminal used by the calling party, while image information photographed with a camera of the mobile phone terminal used by the calling party is displayed on a display of the mobile phone terminal used by the called party. However, for example, in a state in which the calling party is not looking at the display because he is engaged with another work, there is no need to transmit the image information on the mobile phone terminal used by the called party to the mobile phone terminal used by the calling party.

The patent documents include one that discloses a technology for performing face recognition processing based on the image information photographed with the camera of the mobile phone terminal and shifting to a voice call mode when a face cannot be recognized. In this technology, a shift is made to the voice call mode even when an attempt is made to look at a picture of a communication counterpart, and hence it is not possible to look at the picture of the communication counterpart.

In other words, whether or not an own terminal is allowed to transmit a picked-up image is controlled based on whether or not a facial image is being picked up on the own terminal. Therefore, an image that does not include the facial image, such as a landscape or an object, cannot be sent to the communication counterpart.

According to an aspect of the disclosures made herein, an information processing device includes an image pickup unit that picks up an image including a facial image of a speaker; a transmission unit that transmits a picked-up image; a reception unit that receives an image including a facial image picked up by a communication counterpart device; a display unit that displays a received image; and a transmission control unit that inhibits transmission of the image picked up by the image pickup unit in a case where the facial image is not being picked up by the communication counterpart device.

Objects and advantages of the invention will be realized and attained by means of the elements and combinations particularly pointed out in the claims.

BRIEF DESCRIPTION OF THE DRAWINGS

FIG. 3A is a diagram for illustrating first image transmission control processing;
FIG. 3B is a diagram for illustrating first image transmission control processing;
FIG. 6A is a diagram for illustrating second image transmission control processing;
FIG. 6B is a diagram for illustrating second image transmission control processing;
FIG. 8D is a flowchart for illustrating the second image transmission control processing;
FIG. 9 is a diagram for illustrating third image transmission control processing;
and
FIG. 10 is a diagram for illustrating the third image transmission control processing.

DESCRIPTION OF EMBODIMENTS

Figure 1:
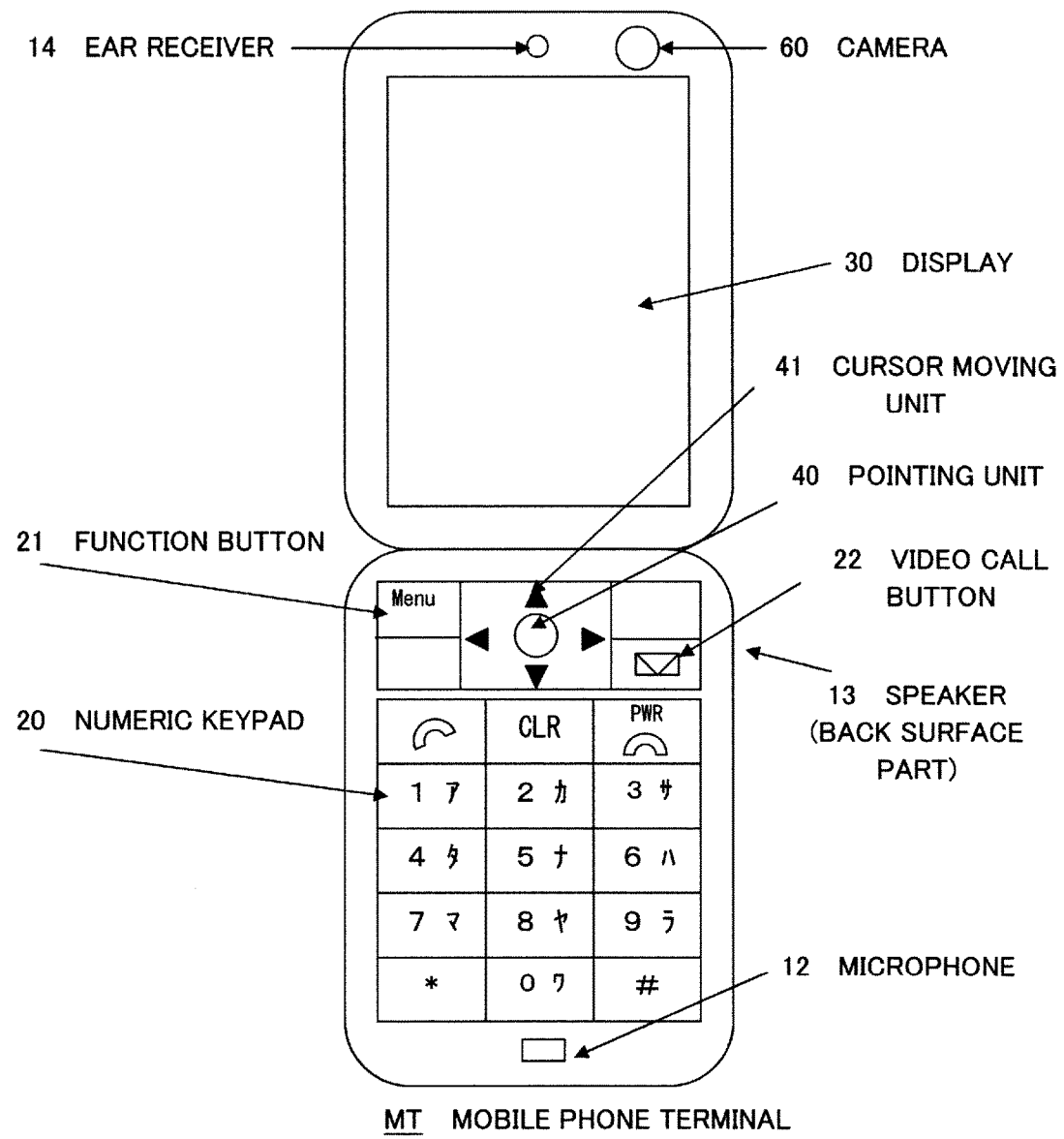
FIG. 1 illustrates a mobile phone terminal according to an embodiment.

The embodiments of the disclosures made herein will be described below referring to the drawings in detail. The drawings illustrate preferred embodiments. It should be understood, however, that the embodiments can be implemented by many different embodiments, and are not limited to the embodiments described herein.

Configuration of Mobile Phone Terminal

Figure 2:
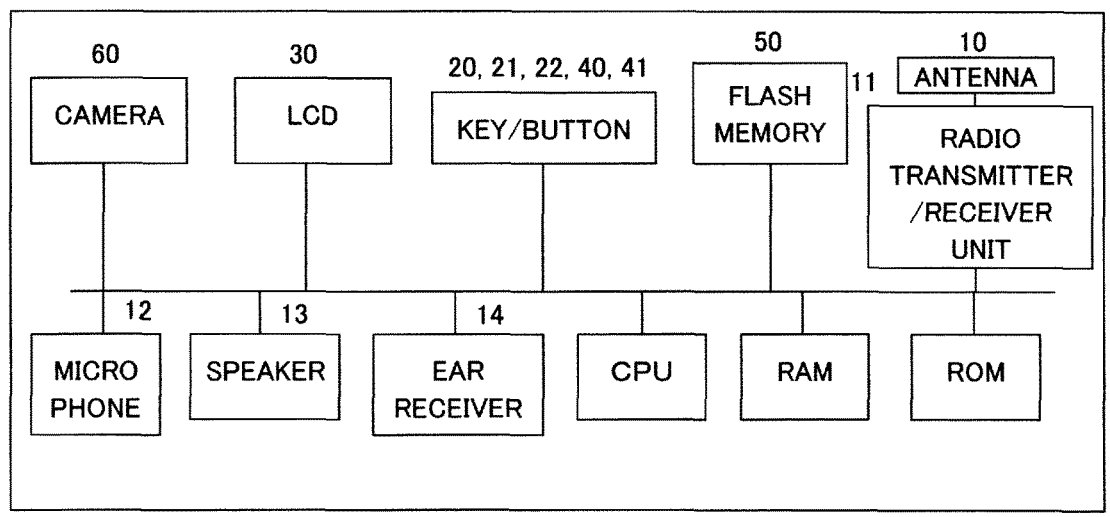
FIG. 2 is a block diagram illustrating a configuration of the mobile phone terminal according to the embodiment.

FIG. 1 and FIG. 2 illustrate a configuration of a mobile phone terminal MT including an image transmission control function according to an embodiment.

Any portable information terminal, such as a laptop personal computer, that includes a control function unit, a communication function unit, an information input function unit, an information display function unit, an information designation function unit, an information retaining function unit, and an image pickup function unit may be employed as the mobile phone terminals MT used by a calling party (calling speaker) and a called party (called speaker) involved in a video call.

This mobile phone terminal MT includes the following elements as hardware components. In other words, the control function unit includes a central processing unit (CPU) serving as a processor, a random access memory (RAM) serving as a work memory, and a read only memory (ROM) that stores a boot program for a startup.

The communication function unit includes an antenna 10, a radio transmitter/receiver unit 11, a microphone 12, a speaker 13, and an ear receiver 14. Further, the information input function unit includes a numeric keypad 20 and various function buttons (keys) 21 and 22, the information display function unit includes a display 30, and the information designation function unit includes a pointing unit 40 and a cursor moving unit 41.

In addition, the information retaining function unit includes a nonvolatile flash memory 50 that saves an operating system (OS), various application programs, and various kinds of information (including data) in a rewritable manner, and the image pickup function unit includes a camera 60.

In order to logically realize the image transmission control function that cooperates with a video call function described later in detail, on the respective mobile phone terminals MT, with an image transmission control program previously installed in the flash memory 50 of the information retaining function unit as the application program, the CPUs expand this image transmission control program into the RAMs and execute the program in response to triggers such as requests from the calling party and the called party involved in the video call, in other words, origination of a call through a video call button 22 and answering the call through the video call button 22.

The image transmission control program carries out image transmission control processing in cooperation with the above-mentioned hardware components such as the control function unit, the communication function unit, the information input function unit, the information display function unit, the information designation function unit, the information retaining function unit, and the image pickup function unit.

Operation

Next, the image transmission control function that cooperates with the video call function included in the mobile phone terminal MT according to the embodiment illustrated in FIG. 1 and FIG. 2 is described by also referring to the related figures.

The mobile phone terminal MT used by the calling party or the called party involved in the video call has a feature in that whether or not an own terminal is allowed to transmit a picked-up image is controlled based on whether or not a facial image is being picked up on a communication counterpart terminal.

First Image Transmission Control Processing

In first image transmission control processing, in a case where a mobile phone terminal (A-side terminal) MT(A) used by the calling party cannot recognize A's face based on the image photographed with the camera 60 of the A-side terminal MT(A), an image transmission inhibition message "inhibition msg" is transmitted from the A-side terminal MT(A) to a mobile phone terminal (B-side terminal) MT(B) used by the called party. The B-side terminal MT(B) that has received this image transmission inhibition message "inhibition msg" is inhibited from transmitting the image photographed with the camera 60 of the B-side terminal MT(B).

In addition, in this state, in a case where the face can be recognized in the image photographed with the camera 60 of the A-side terminal MT(A), an image transmission inhibition cancelling message "inhibition cancelling msg" is transmitted from the A-side terminal MT(A) to the B-side terminal MT(B). The B-side terminal MT(B) that has received this image transmission inhibition cancelling message "inhibition cancelling msg" restarts the transmission of the image photographed with the camera 60 of the B-side terminal MT(B).

FIG. 3A and FIG. 3B illustrate an outline of the first image transmission control processing in time series. In a state of No. 1, by bidirectionally transmitting/receiving pieces of image information (transmitting/receiving moving images) photographed with the camera 60 of the A-side terminal MT(A) and the camera 60 of the B-side terminal MT(B), the facial image is displayed on the display (LCD) 30 of the communication counterpart terminal.

A state of No. 2, to which a transition is made from the state of No. 1, indicates a case where the face cannot be recognized (face recognition NG) because a subject other than A's face (here, flower) is being photographed with the camera 60 of the A-side terminal MT(A). In the case where the face cannot be recognized, the image transmission inhibition message "inhibition msg" (hereinafter sometimes referred to simply as "inhibition msg") is transmitted from the A-side terminal MT(A) to the B-side terminal MT(B). The B-side terminal MT(B) that has received this "inhibition msg" is controlled so as not to transmit the facial image photographed with the camera 60 of the B-side terminal MT(B) to the A-side terminal MT(A) (stop transmission).

A state of No. 3, to which a transition is made from the state of No. 2, indicates a case where A's face photographed with the camera 60 of the A-side terminal MT(A) is recognized (face recognition OK). In the case where A's face is recognized, the image transmission inhibition cancelling message "inhibition cancelling msg" (hereinafter sometimes referred to simply as "inhibition cancelling msg") is transmitted from the A-side terminal MT(A). The B-side terminal MT(B) that has received this "inhibition cancelling msg" transmits the facial image photographed with the camera 60 of the B-side terminal MT(B) to the A-side terminal MT(A). Therefore, the state returns to a bidirectional image transmission/reception state.

A state of No. 4, to which a transition is made from the state of No. 3, indicates the case where the face cannot be recognized because, contrary to No. 2, a subject other than B's face (here, automobile) is being photographed with the camera 60 of the B-side terminal MT(B). In this case, the "inhibition msg" is transmitted from the B-side terminal MT(B) to the A-side terminal MT(A). The A-side terminal MT(A) that has received this "inhibition msg" is controlled so as not to transmit the image photographed with the camera 60 of the A-side terminal MT(A) to the B-side terminal MT(B).

A state of No. 5, to which a transition is made from the state of No. 4, indicates the case where the face cannot be recognized because, in addition, the subject other than A's face is being photographed with the camera 60 of the A-side terminal MT(A). In the case where A's face cannot be recognized, the "inhibition msg" is transmitted from the A-side terminal MT(A) to the B-side terminal MT(B). The B-side terminal MT(B) that has received this "inhibition msg" is controlled so as not to transmit the image photographed with the camera 60 of the B-side terminal MT(B) to the A-side terminal MT(A). Therefore, a bidirectional image transmission/reception stopped state is effected.

A state of No. 6, to which a transition is made from the state of No. 5, indicates the case where B's face photographed with the camera 60 of the B-side terminal MT(B) is recognized. In this case, the "inhibition cancelling msg" is transmitted from the B-side terminal MT(B) to the A-side terminal MT(A). In response thereto, the A-side terminal MT(A) that has received the "inhibition cancelling msg" transmits the image photographed with the camera 60 of the A-side terminal MT(A) to the B-side terminal MT(B).

Figure 4A:
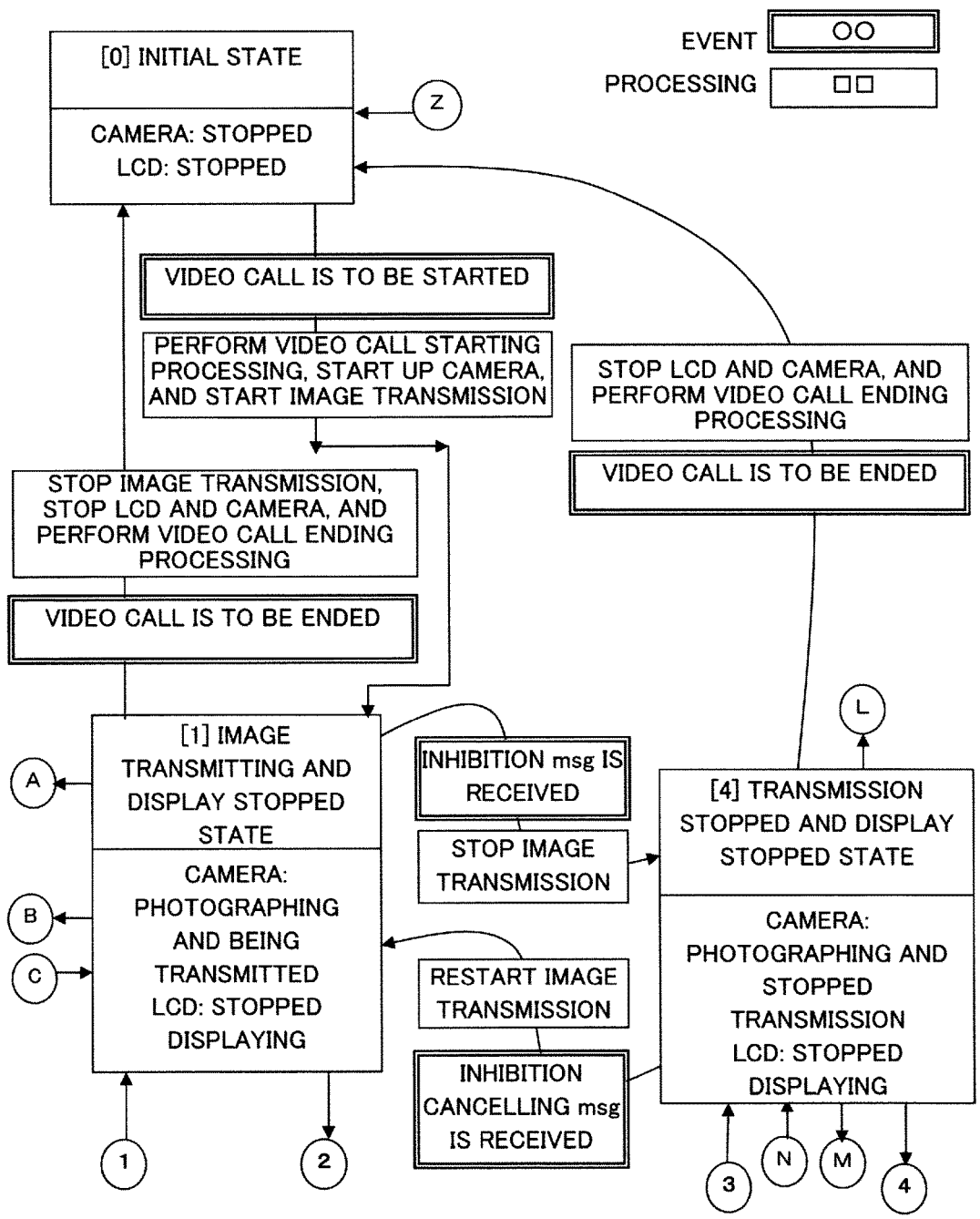
FIG. 4A is a state transition diagram for illustrating the first image transmission control processing.
Figure 4B:
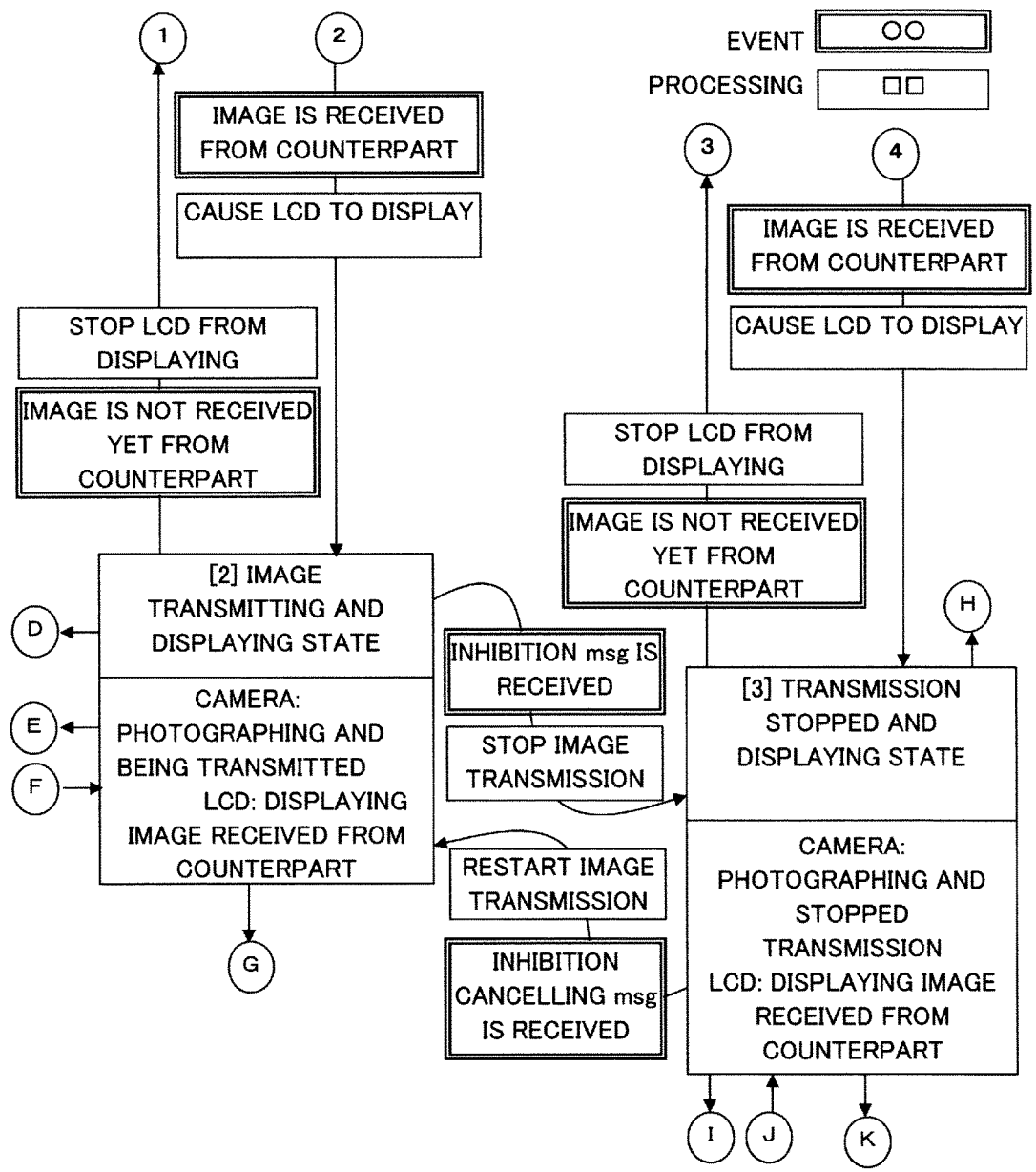
FIG. 4B is a state transition diagram for illustrating the first image transmission control processing.
Figure 4C:
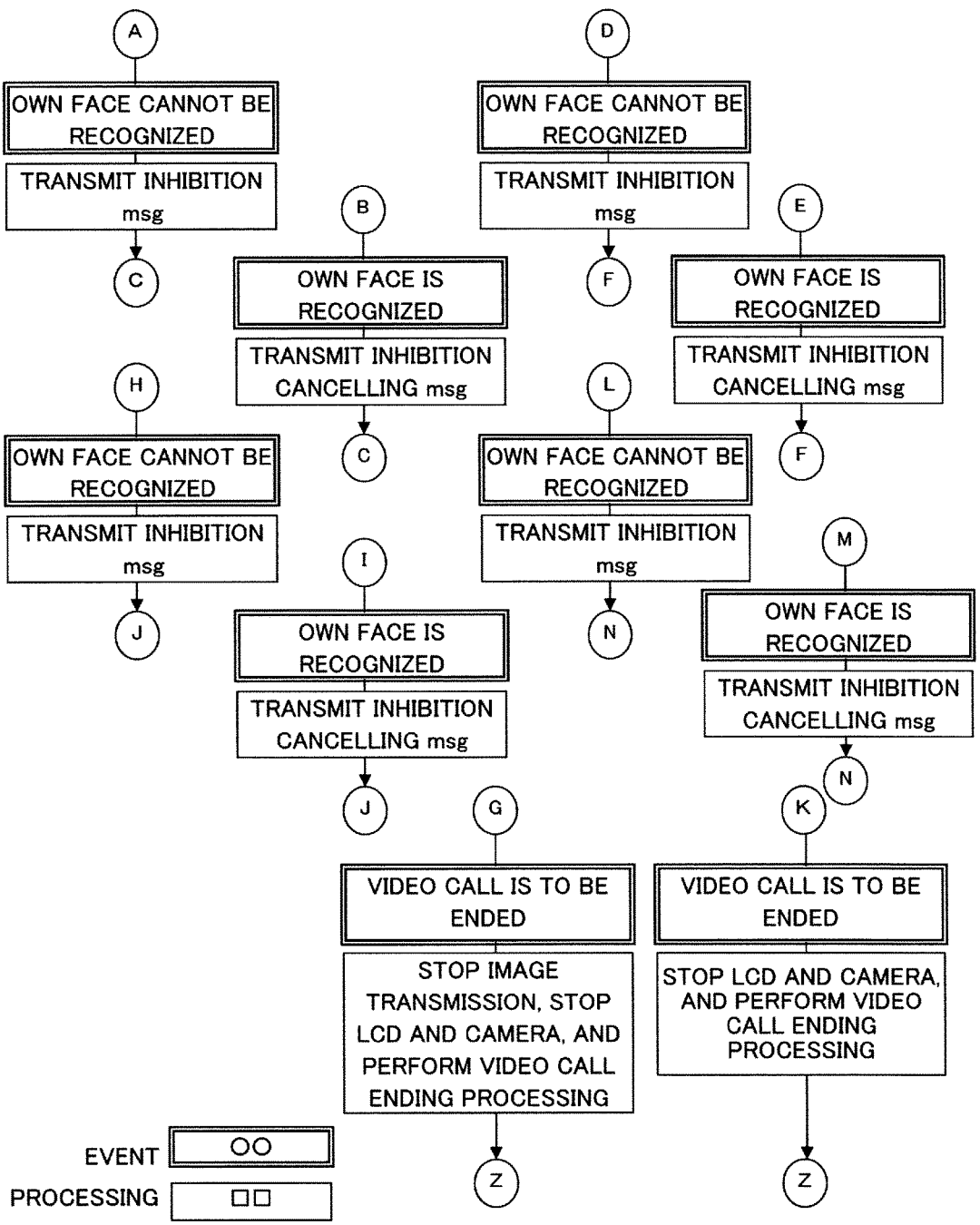
FIG. 4C is a state transition diagram for illustrating the first image transmission control processing.

Next, the first image transmission control processing is described in detail with reference to state transition diagrams illustrated in FIG. 4A, FIG. 4B and FIG. 4C.

A state [0] is an initial state in which communication (voice call) using a video call is not being performed, and hence the cameras 60 and the displays (LCDs) 30 are in a stopped state on the mobile phone terminal (A-side terminal) MT(A) used by the calling party and the mobile phone terminal (B-side terminal) MT(B) used by the called party.

A state [1] is a state in which the image being photographed with the camera 60 of the own terminal (for example, A-side terminal MT(A)) is being transmitted and the image received from the communication counterpart terminal (for example, B-side terminal MT(B)) is not being displayed on the display 30 (image transmitting and display stopped state).

A state [2] is a state in which the image being photographed with the camera 60 of the own terminal is being transmitted and the image received from the communication counterpart terminal is being displayed on the display 30 (image transmitting and displaying state).

A state [3] is a state in which the image being photographed with the camera 60 of the own terminal is not being transmitted and the image received from the communication counterpart terminal is being displayed on the display 30 (transmission stopped and displaying state).

A state [4] is a state in which the image being photographed with the camera 60 of the own terminal is not being transmitted and the image received from the communication counterpart terminal is not being displayed on the display 30 (transmission stopped and display stopped state).

When the video call is started in the state [0], video call starting processing is performed, the camera 60 is started up, the image information photographed with the camera 60 of the own terminal starts to be transmitted to the communication counterpart terminal involved in the video call, and a transition is made to the state [1].

When the video call is ended in the state [1], the image being photographed with the camera 60 of the own terminal is stopped from being transmitted, the display 30 is stopped from displaying, the camera 60 is stopped, video call ending processing is performed, and a transition is made to the state [0].

When the face cannot be recognized based on the image being photographed with the camera 60 of the own terminal in the state [1], the image transmission inhibition message "inhibition msg" is transmitted to the communication counterpart terminal, and the state remains the state [1].

When the face can be recognized based on the image being photographed with the camera 60 of the own terminal in the state [1], the image transmission inhibition cancelling message "inhibition cancelling msg" is transmitted to the communication counterpart terminal, and the state remains the state [1].

When the "inhibition msg" is received from the communication counterpart terminal in the state [1], the image being photographed with the camera 60 of the own terminal is stopped from being transmitted, and a transition is made to the state [4].

When the image is received from the communication counterpart terminal in the state [1], the image received from the communication counterpart terminal is displayed on the display 30, and a transition is made to the state [2].

If the image is no longer received from the communication counterpart terminal in the state [2], the display 30 is stopped from displaying, and a transition is made to the state [1].

When the face cannot be recognized based on the image being photographed with the camera 60 of the own terminal in the state [2], the "inhibition msg" is transmitted to the communication counterpart terminal, and the state remains the state [2].

When the face can be recognized based on the image being photographed with the camera 60 of the own terminal in the state [2], the "inhibition cancelling msg" is transmitted to the communication counterpart terminal, and the state remains the state [2].

When the "inhibition msg" is received from the communication counterpart terminal in the state [2], the image being photographed with the camera 60 of the own terminal is stopped from being transmitted, and a transition is made to the state [3].

When the video call is ended in the state [2], the image being photographed with the camera 60 of the own terminal is stopped from being transmitted, the display 30 is stopped from displaying, the camera 60 is stopped, video call ending processing is performed, and a transition is made to the state [0].

If the image is no longer received from the communication counterpart terminal in the state [3], the display 30 is stopped from displaying, and a transition is made to the state [4].

When the face cannot be recognized based on the image being photographed with the camera 60 of the own terminal in the state [3], the "inhibition msg" is transmitted to the communication counterpart terminal, and the state remains the state [3].

When the face can be recognized based on the image being photographed with the camera 60 of the own terminal in the state [3], the "inhibition cancelling msg" is transmitted to the communication counterpart terminal, and the state remains the state [3].

When the "inhibition cancelling msg" is received from the communication counterpart terminal in the state [3], the image being photographed with the camera 60 of the own terminal restarts the transmission, and a transition is made to the state [2].

When the video call is ended in the state [3], the display 30 is stopped from displaying, the camera 60 is stopped, video call ending processing is performed, and a transition is made to the state [0].

When the image is received from the communication counterpart terminal in the state [4], the image received from the communication counterpart terminal is displayed on the display 30, and a transition is made to the state [3].

When the face cannot be recognized based on the image being photographed with the camera 60 of the own terminal in the state [4], the "inhibition msg" is transmitted to the communication counterpart terminal, and the state remains the state [4].

When the face can be recognized based on the image being photographed with the camera 60 of the own terminal in the state [4], the "inhibition cancelling msg" is transmitted to the communication counterpart terminal, and the state remains the state [4].

When the "inhibition cancelling msg" is received from the communication counterpart terminal in the state [4], the image being photographed with the camera 60 of the own terminal restarts to be transmitted, and a transition is made to the state [1].

When the video call is ended in the state [4], the display 30 is stopped from displaying, the camera 60 is stopped, video call ending processing is performed, and a transition is made to the state [0].

Figure 5A:
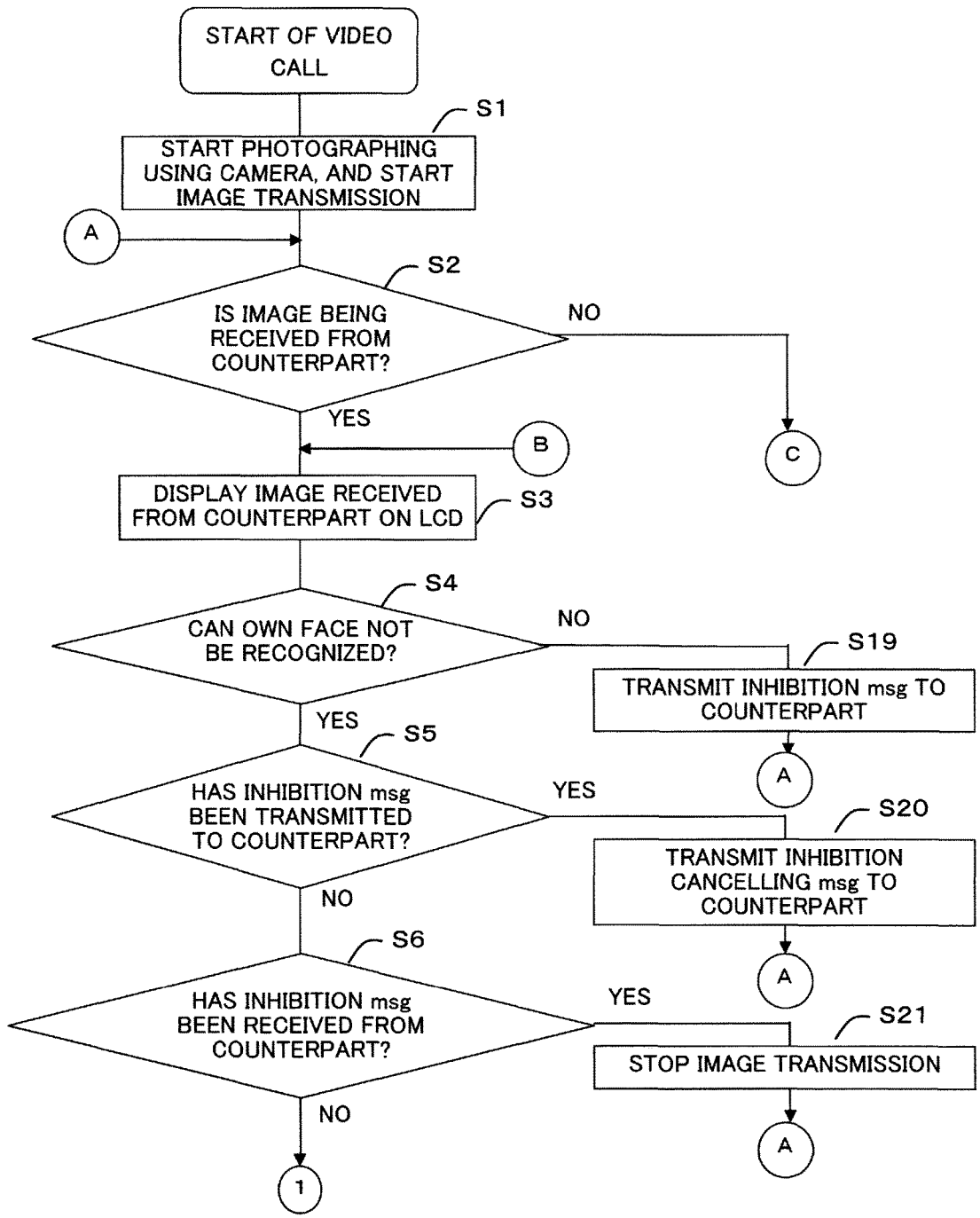
FIG. 5A is a flowchart for illustrating the first image transmission control processing.
Figure 5B:
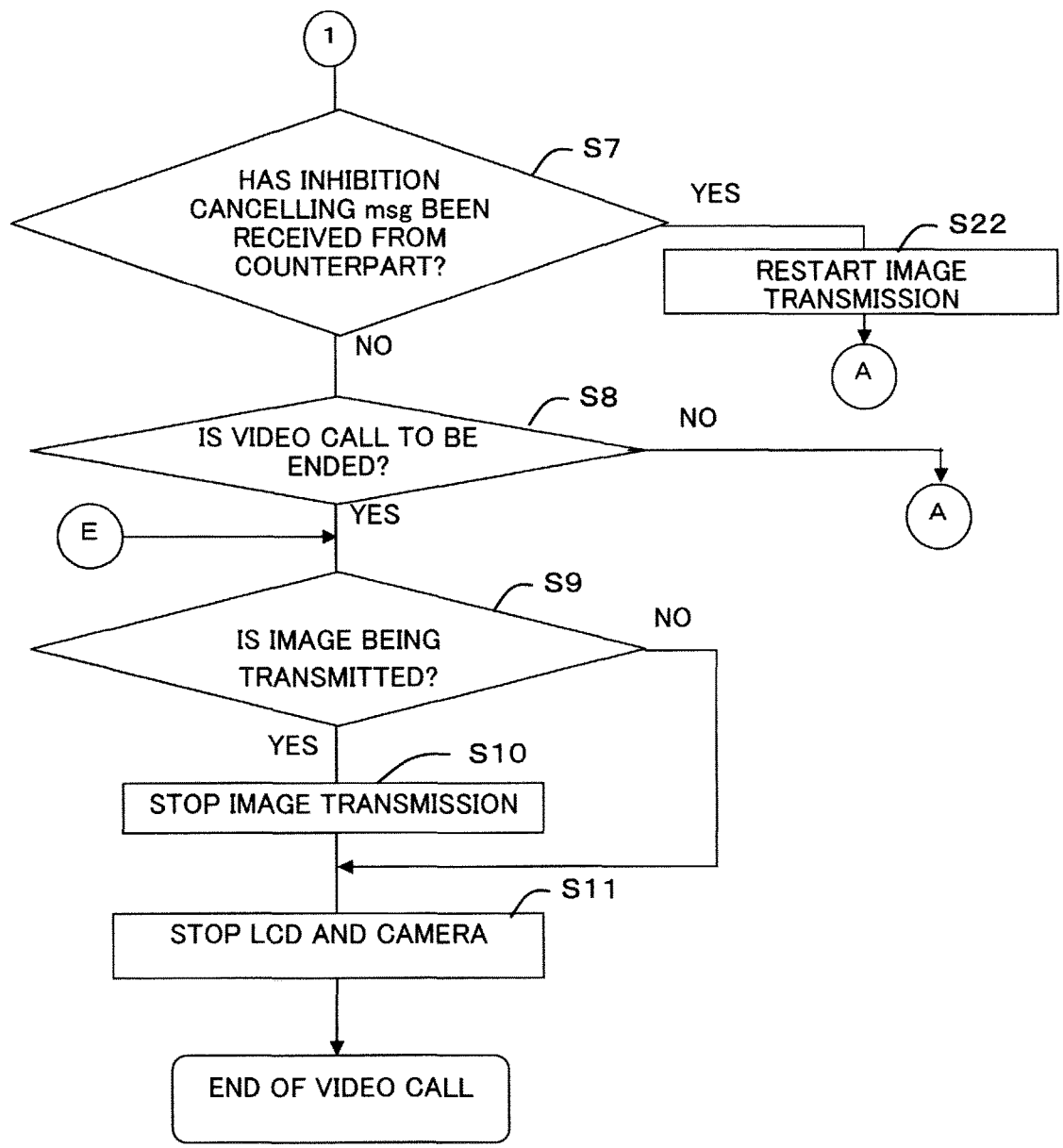
FIG. 5B is a flowchart for illustrating the first image transmission control processing.
Figure 5C:
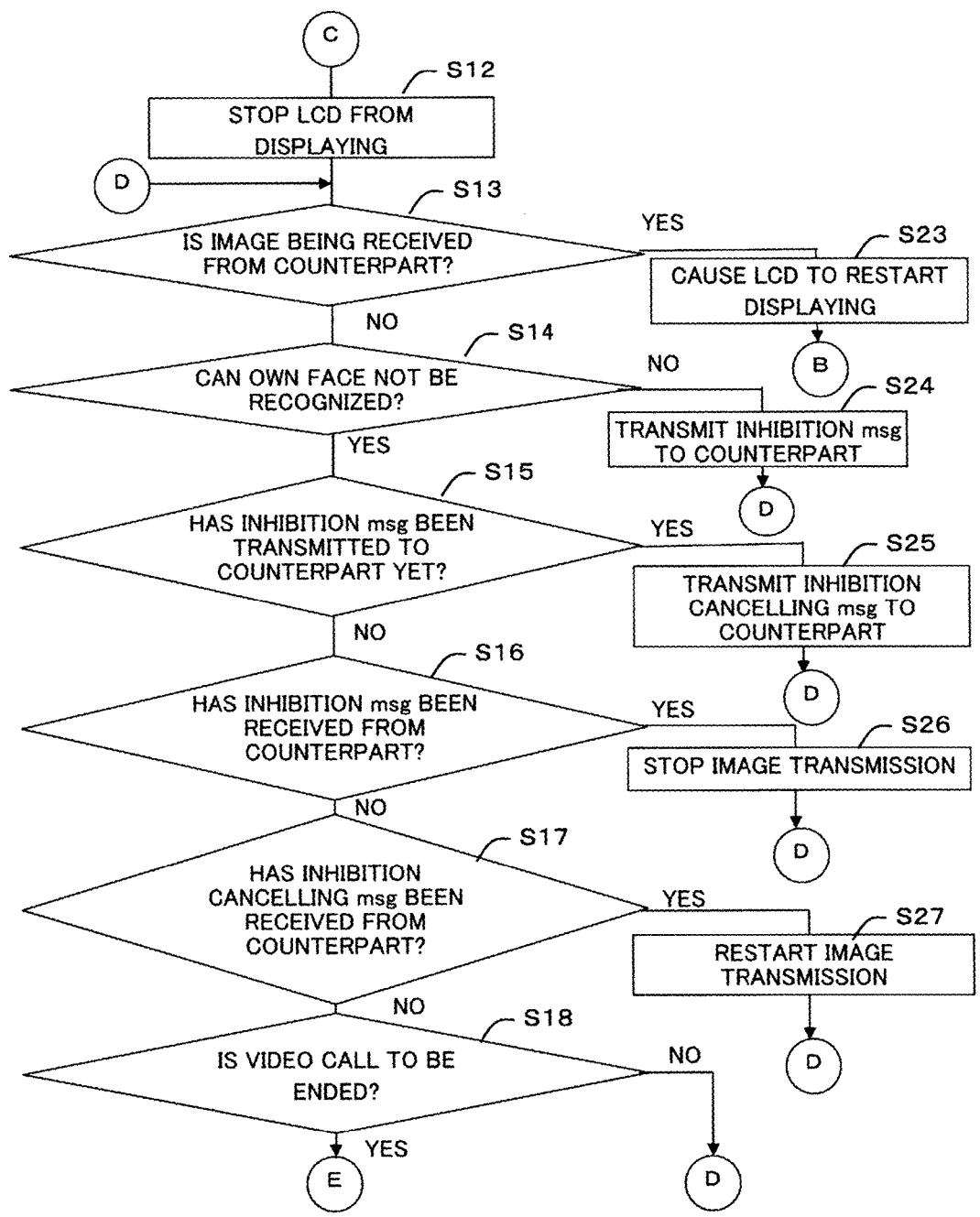
FIG. 5C is a flowchart for illustrating the first image transmission control processing.
Figure 7A:
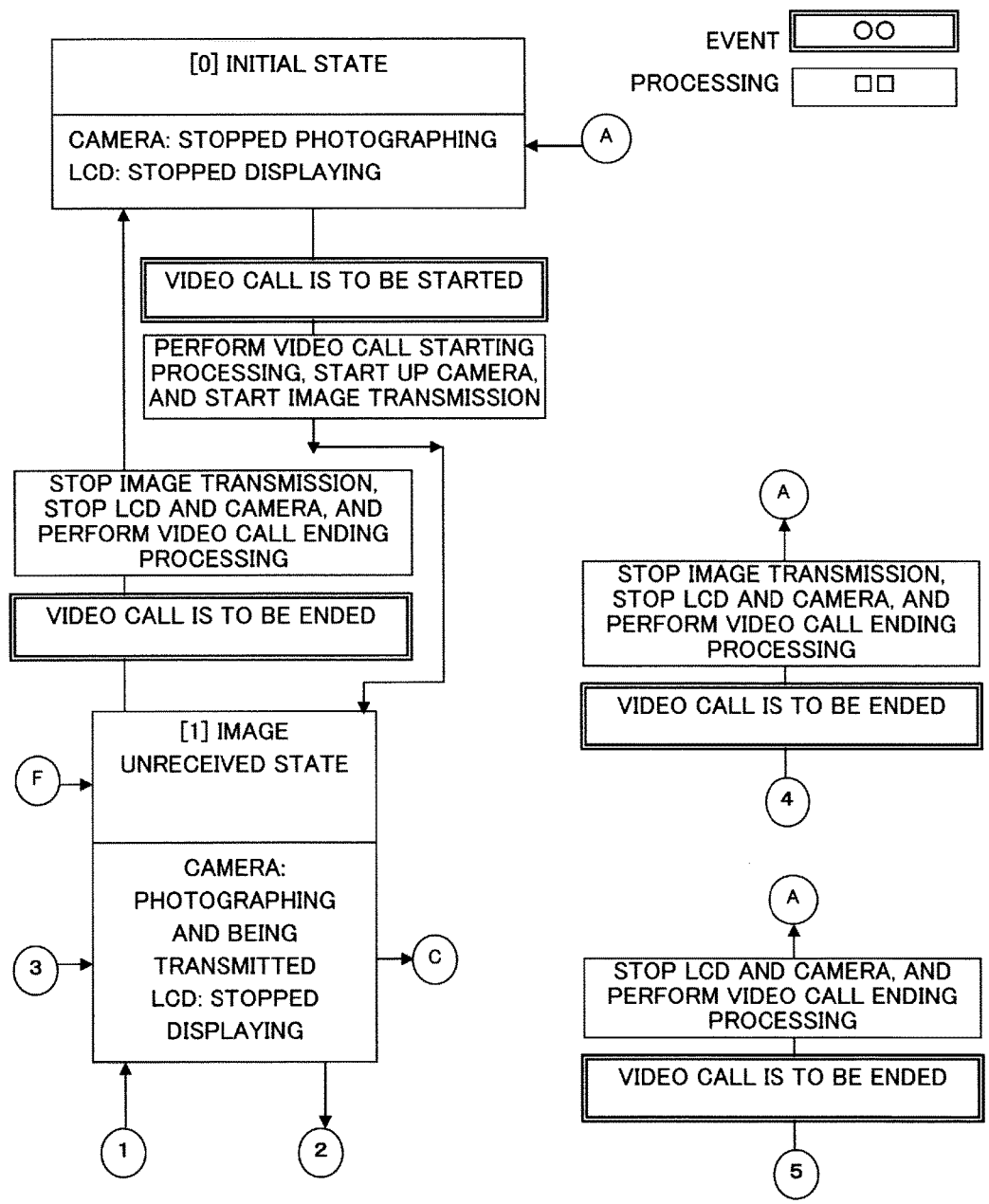
FIG. 7A is a state transition diagram for illustrating the second image transmission control processing.
Figure 7B:
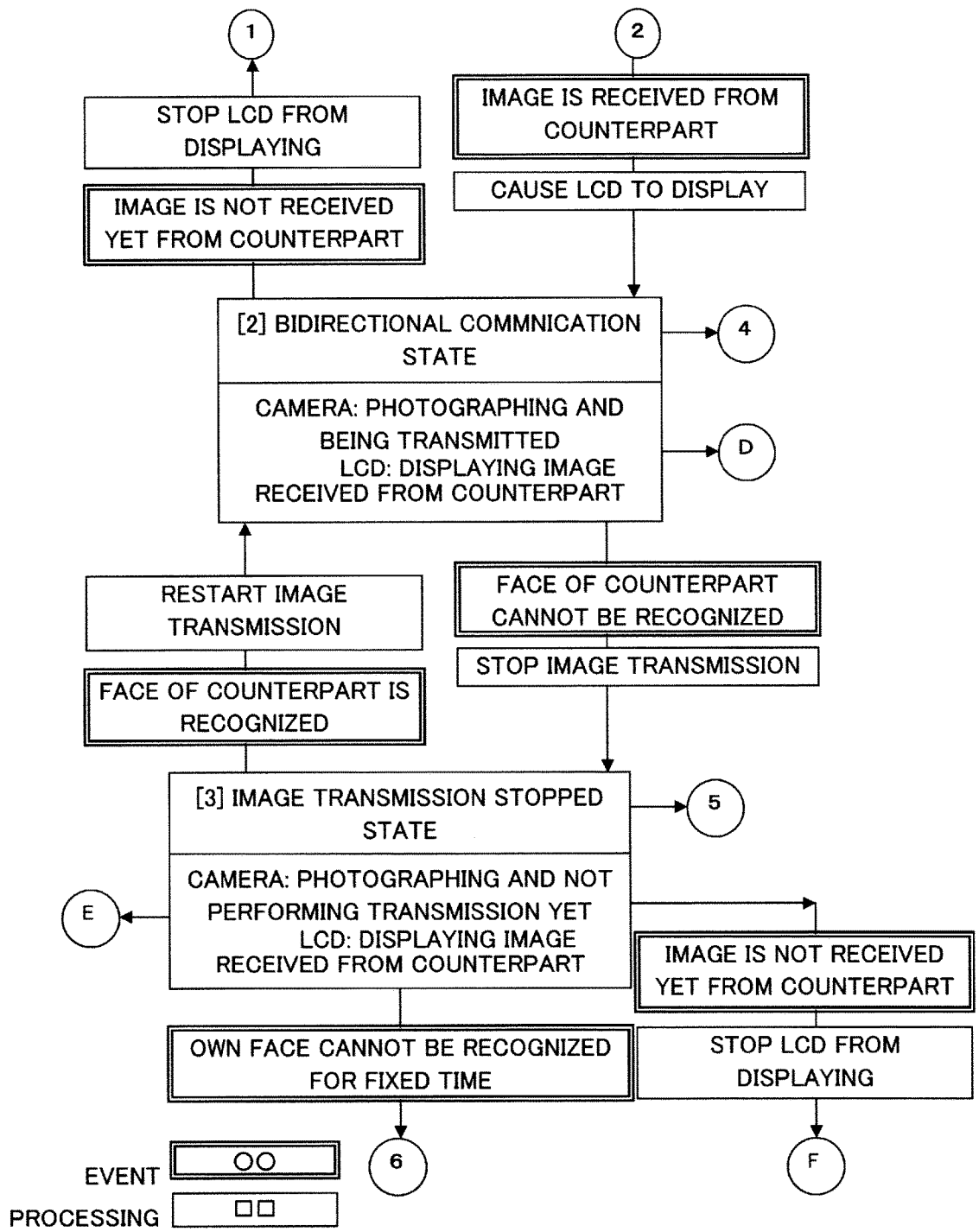
FIG. 7B is a state transition diagram for illustrating the second image transmission control processing.
Figure 7C:
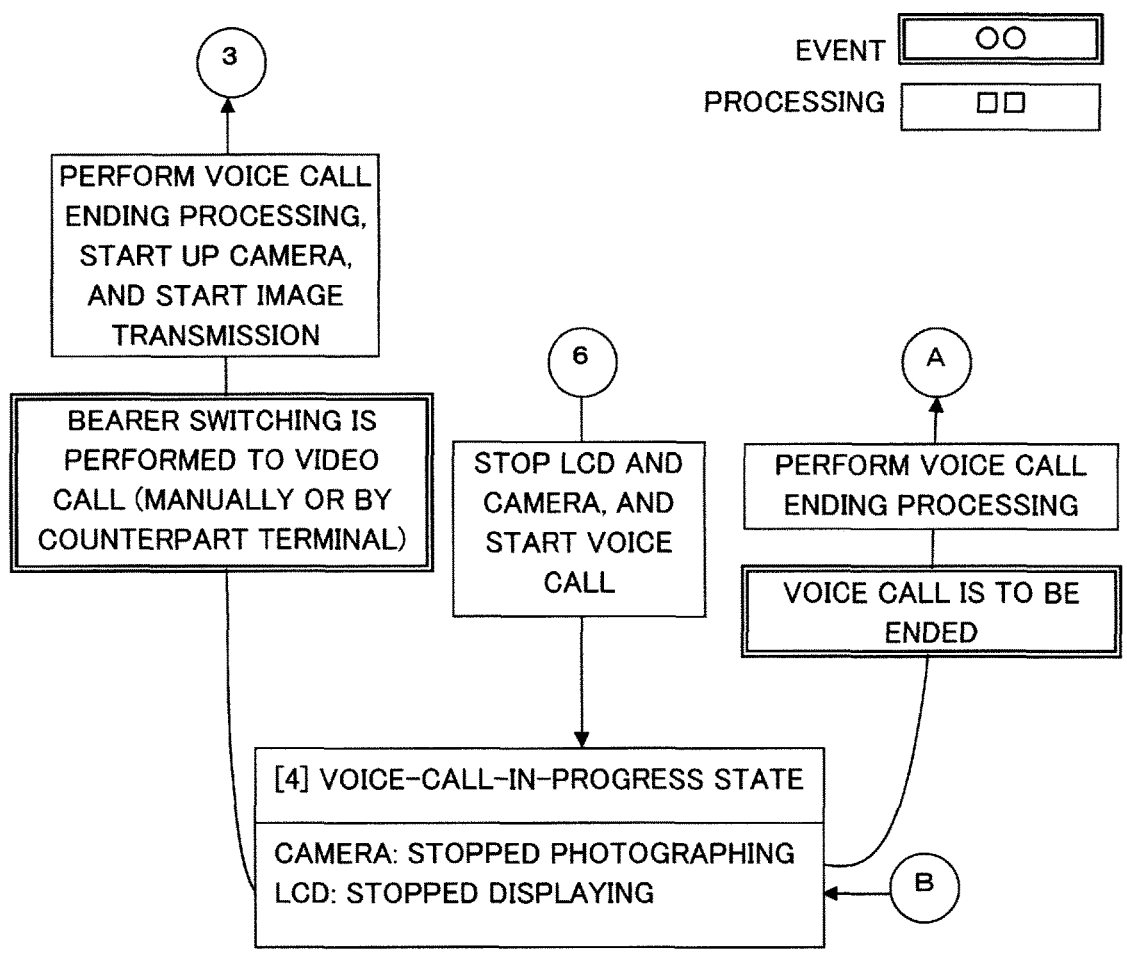
FIG. 7C is a state transition diagram for illustrating the second image transmission control processing.
Figure 7D:
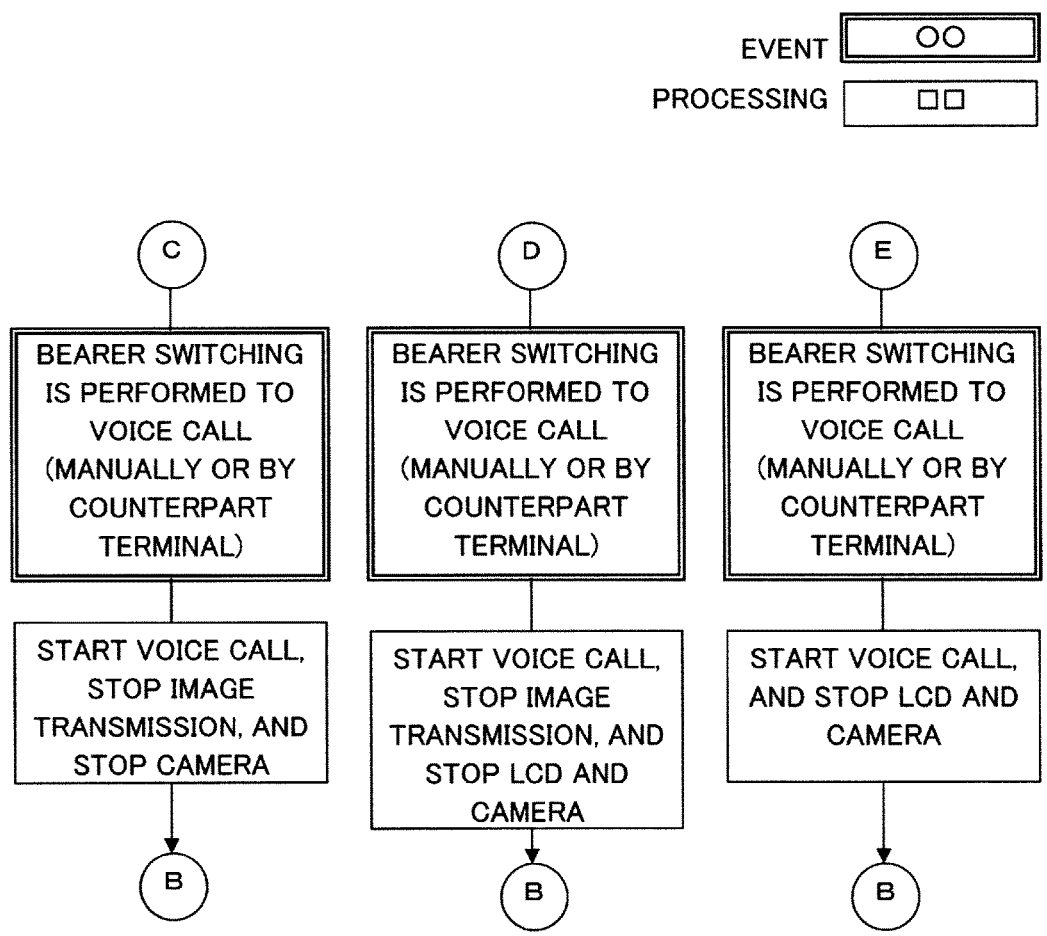
FIG. 7D is a state transition diagram for illustrating the second image transmission control processing.
Figure 8A:
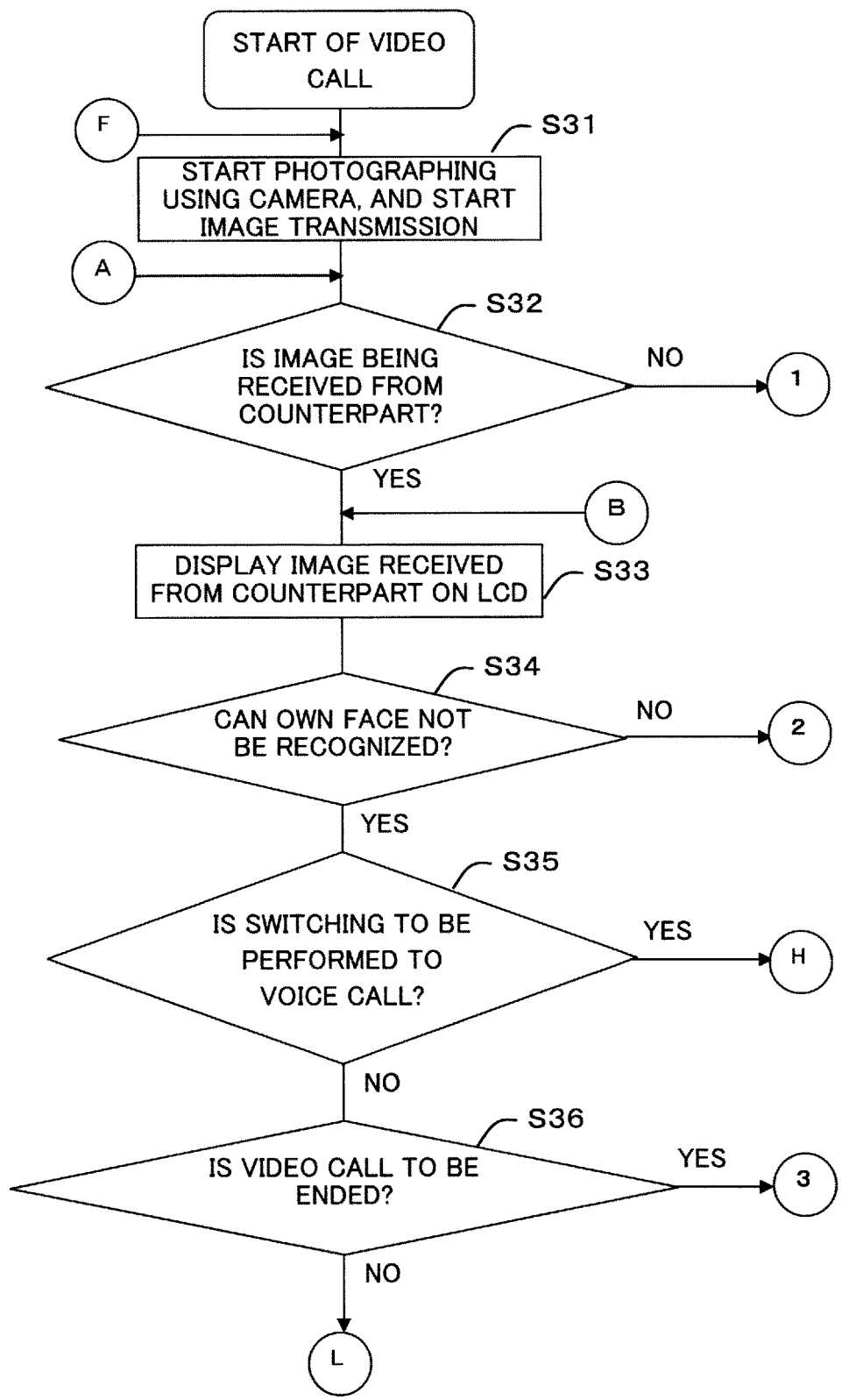
FIG. 8A is a flowchart for illustrating the second image transmission control processing.
Figure 8B:
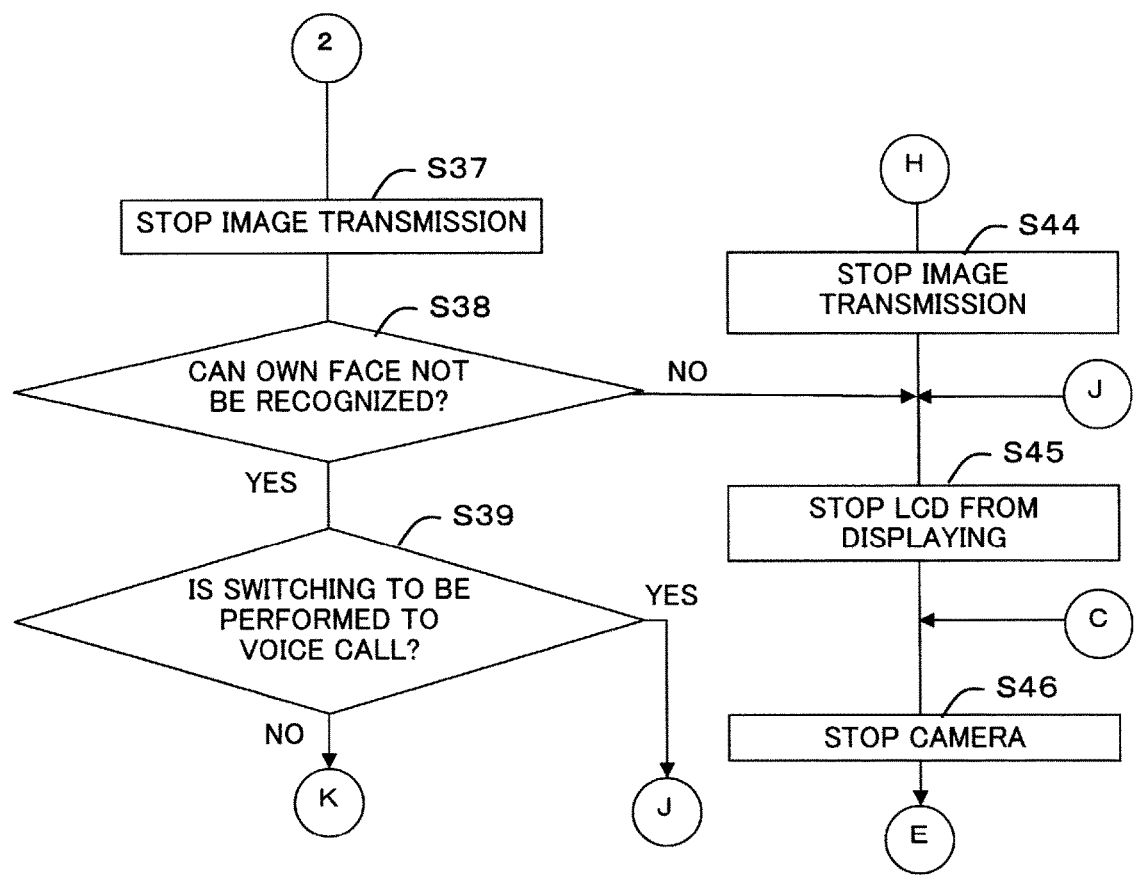
FIG. 8B is a flowchart for illustrating the second image transmission control processing.
Figure 8C:
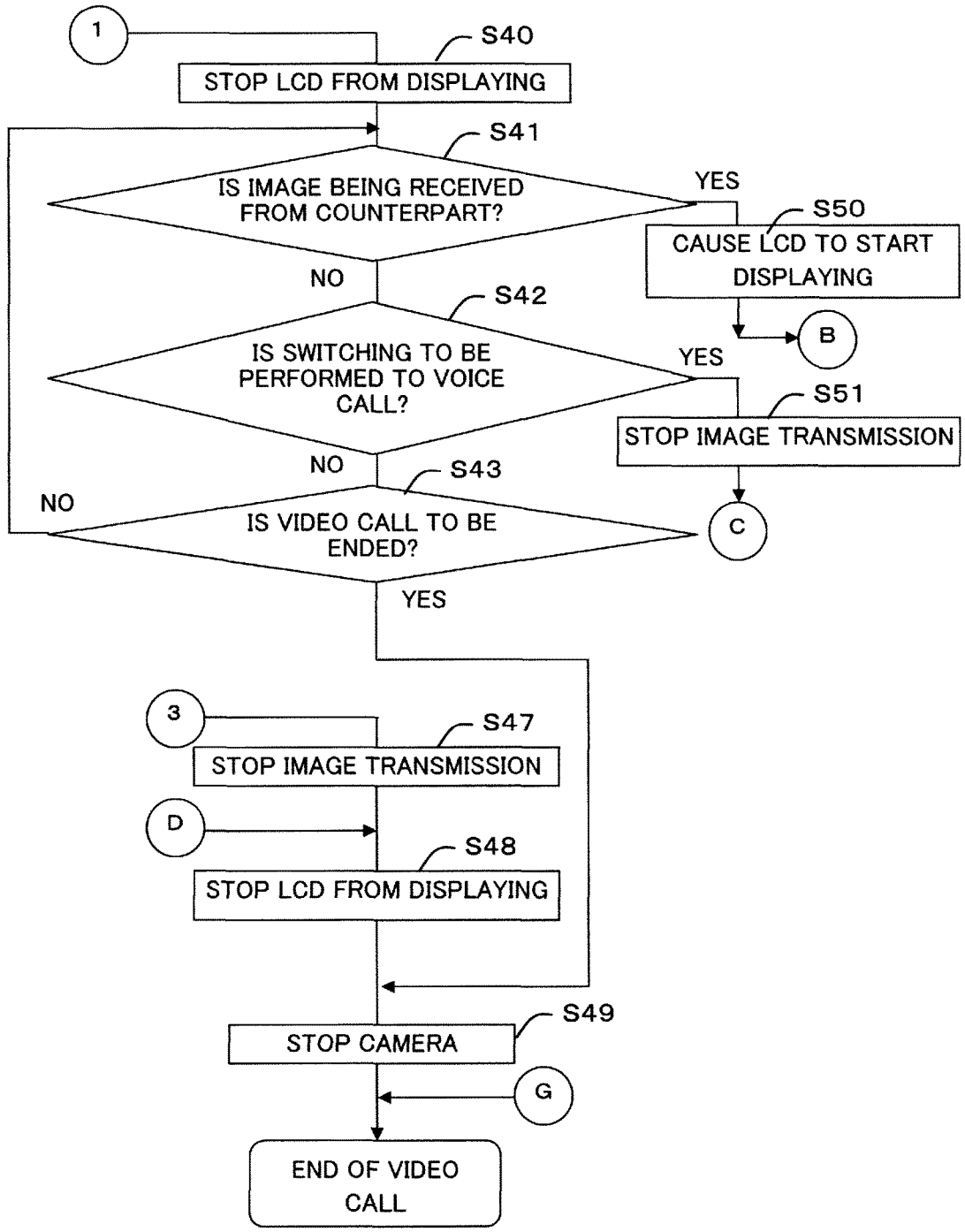
FIG. 8C is a flowchart for illustrating the second image transmission control processing.

Next, the first image transmission control processing is described in detail with reference to flowcharts illustrated in FIG. 5A, FIG. 5B and FIG. 5C.

When the video call is started between the mobile phone terminal (A-side terminal) MT(A) used by the calling party and the mobile phone terminal (B-side terminal) MT(B) used by the called party, [S1] the photographing using the camera is started, and the photographed image is transmitted to the communication counterpart terminal involved in the video call. [S2] It is verified whether or not the image is being received from the communication counterpart terminal. If the image is being received from the communication counterpart terminal, the procedure advances to Step S3, and if not being received, the procedure advances to Step S12. [S3] The received image is displayed on the display 30 because the image is being received from the communication counterpart terminal.

[S4] It is verified whether or not the face is recognized based on the image being photographed with the camera 60 of the own terminal. If the face is recognized, the procedure advances to Step S5, and if the face cannot be recognized, the procedure advances to Step S19. [S5] It is verified whether or not the "inhibition msg" has been transmitted to the communication counterpart terminal. If the "inhibition msg" has been transmitted, the procedure advances to Step S20, and if the "inhibition msg" has not been transmitted, the procedure advances to Step S6. [S6] It is verified whether or not the "inhibition msg" has been received from the communication counterpart terminal. If the "inhibition msg" has been received, the procedure advances to Step S21, and if the "inhibition msg" has not been received, the procedure advances to S7.

[S7] It is verified whether or not the "inhibition cancelling msg" has been received from the communication counterpart terminal. If the "inhibition cancelling msg" has been received, the procedure advances to Step S22, and if the "inhibition cancelling msg" has not been received, the procedure advances to S8. [S8] It is verified whether or not the video call is to be ended. If the video call is to be ended, the procedure advances to Step S9, and if the video call is not to be ended, the procedure advances to Step S2. [S9] It is verified whether or not the image is being transmitted. If being transmitted, the procedure advances to Step S10, and if not being transmitted, the procedure advances to Step S11.

[S10] The transmission of the image, which is being photographed with the camera 60 of the own terminal, is stopped. [S11] The display 30 is stopped from displaying, the camera 60 is stopped, and the video call is ended. [S12] The display 30 is stopped from displaying. [S13] It is verified whether or not the image is being received from the communication counterpart terminal. If being received, the procedure advances to Step S23, and if not being received, the procedure advances to Step S14.

It is verified whether or not the face is recognized based on the image being photographed with the camera 60 of the own terminal. If the face is recognized, the procedure advances to Step S15, and if the face cannot be recognized, the procedure advances to Step S24. [S15] It is verified whether or not the "inhibition msg" has been transmitted to the communication counterpart terminal. If the "inhibition msg" has been transmitted, the procedure advances to Step S25, and if the "inhibition msg" has not been transmitted, the procedure advances to Step S16. [S16] It is verified whether or not the "inhibition msg" has been received from the communication counterpart terminal. If the "inhibition msg" has been received, the procedure advances to Step S26, and if the "inhibition msg" has not been received, the procedure advances to S17.

[S17] It is verified whether or not the "inhibition cancelling msg" has been received from the communication counterpart terminal. If the "inhibition cancelling msg" has been received, the procedure advances to Step S27, and if the "inhibition cancelling msg" has not been received, the procedure advances to S18. [S18] It is verified whether or not the video call is to be ended. If the video call is to be ended, the procedure advances to Step S9, and if the video call is not to be ended, the procedure advances to Step S13.

[S19] The "inhibition msg" is transmitted to the communication counterpart terminal.

[S20] The "inhibition cancelling msg" is transmitted to the communication counterpart terminal. [S21] The image being photographed with the camera 60 of the own terminal is stopped from being transmitted to the communication counterpart terminal. [S22] The image being photographed with the camera 60 of the own terminal is transmitted to the communication counterpart terminal. [S23] The image being received from the communication counterpart terminal is displayed on the display 30.

[S24] The "inhibition msg" is transmitted to the communication counterpart terminal. [S25] The "inhibition cancelling msg" is transmitted to the communication counterpart terminal.

[S26] The image being photographed with the camera 60 of the own terminal is stopped from being transmitted to the communication counterpart terminal. [S27] The image being photographed with the camera 60 of the own terminal is transmitted to the communication counterpart terminal.

Second Image Transmission Control Processing

In second image transmission control processing, the mobile phone terminal (B-side terminal) MT(B) used by the called party verifies whether or not the mobile phone terminal (A-side terminal) MT(A) used by the calling party is referring to the image information obtained from the B-side terminal MT(B) by recognizing the face based on the image information being received by the B-side terminal MT(B). At this time, if it is successfully determined that the A-side terminal MT(A) is not referring to the display, the image information being photographed with the camera on the B-side terminal MT(B) side is inhibited from being transmitted to the A-side terminal MT(A), to thereby inhibit needless image information from being transmitted to each other through a special interface.

FIG. 6A and FIG. 6B illustrate an outline of the second image transmission control processing in time series. In a state of No. 1, by bidirectionally transmitting/receiving pieces of image information (transmitting/receiving moving images) photographed with the camera 60 of the A-side terminal MT(A) and the camera 60 of the B-side terminal MT(B), the facial image is displayed on the display (LCD) 30 of the communication counterpart terminal.

In the state of No. 2, to which a transition is made from the state of No. 1, the subject other than A's face (here, flower) is being photographed with the camera 60 of the A-side terminal MT(A). The B-side terminal MT(B) cannot recognize A's face based on the image received from the A-side terminal MT(A). In this case where the face cannot be recognized (face recognition NG), the B-side terminal MT(B) is controlled so as not to transmit the facial image photographed with the camera 60 of the B-side terminal MT(B) to the A-side terminal MT(A) (stop transmission).

In the state of No. 3, to which a transition is made from the state of No. 2, A's face is being photographed with the camera 60 of the A-side terminal MT(A). The B-side terminal MT(B) can recognize A's face based on the image received from the A-side terminal MT(A). In this case where the face can be recognized (face recognition OK), the facial image photographed with the camera 60 of the B-side terminal MT(B) is transmitted to the A-side terminal MT(A). Therefore, the state returns to the bidirectional image transmission/reception state.

In the state of No. 4, to which a transition is made from the state of No. 3, contrary to No. 2, the subject other than B's face (here, automobile) is being photographed with the camera 60 of the B-side terminal MT(B). In this case, the A-side terminal MT(A) cannot recognize the face based on the image received from the B-side terminal MT(B), and hence the A-side terminal MT(A) is controlled so as not to transmit the facial image photographed with the camera 60 of the A-side terminal MT(A) to the B-side terminal MT(B).

In the state of No. 5, to which a transition is made from the state of No. 4, in addition, the subject other than A's face is being photographed with the camera 60 of the A-side terminal MT(A). In this case, the A-side terminal MT(A) comes to a state in which the face cannot be recognized based on the image photographed with the camera 60 of the A-side terminal MT(A). Therefore, it is determined that the images are being stopped bidirectionally, and bearer switching to the voice call is performed, to thereby set a voice-call-in-progress state represented by the state of No. 6.

Next, the second image transmission control processing is described in detail with reference to state transition diagrams illustrated in FIG. 7A, FIG. 7B, FIG. 7C and FIG. 7D.

A state [0] is an initial state in which communication (voice call) using a video call is not being performed, and hence the cameras 60 and the displays 30 are in a stopped state on the mobile phone terminal (A-side terminal) MT(A) used by the calling party and the mobile phone terminal (B-side terminal) MT(B) used by the called party.

A state [1] is an image unreceived state in which the image being photographed with the camera 60 of the own terminal (for example, A-side terminal MT(A)) is being transmitted and the image received from the communication counterpart terminal (for example, B-side terminal MT(B)) is not being displayed on the display (LCD) 30.

A state [2] is a bidirectional communication state in which the image being photographed with the camera 60 of the own terminal is being transmitted and the image received from the communication counterpart terminal is being displayed on the display 30.

A state [3] is an image transmission stopped state in which the image being photographed with the camera 60 of the own terminal is not being transmitted and the image received from the communication counterpart terminal is being displayed on the display 30.

The state [4] is the voice-call-in-progress state, and the cameras 60 and the displays 30 included in the own terminal and the communication counterpart terminal are in the stopped state.

When the video call is started in the state [0], video call starting processing is performed, the camera 60 is started up, the image information photographed with the camera of the own terminal starts to be transmitted to the communication counterpart terminal involved in the video call, and a transition is made to the state [1].

When the video call is ended in the state [1], the image being photographed with the camera 60 of the own terminal is stopped from being transmitted, the display 30 is stopped from displaying, the camera 60 is stopped, video call ending processing is performed, and a transition is made to the state [0].

In the state [1], when the image is received from the communication counterpart terminal, the image received from the communication counterpart terminal is displayed on the display 30 of the own terminal, and a transition is made to the state [2].

In the state [1], when a change is made to the voice call by the own terminal manually or by the communication counterpart terminal through the bearer switching, the voice call is started, the image being photographed with the camera 60 of the own terminal is stopped from being transmitted, the camera 60 is stopped, and a transition is made to the state [4].

If the image is no longer received from the communication counterpart terminal in the state [2], the display 30 is stopped from displaying, and a transition is made to the state [1].

In the state [2], if the face fails to be recognized based on the image being received from the communication counterpart terminal (if the face cannot be recognized), the image being photographed with the camera 60 of the own terminal is stopped from being transmitted to the communication counterpart terminal, and a transition is made to the state [3].

In the state [2], when a change is made to the voice call by the own terminal manually or by the communication counterpart terminal through the bearer switching, the voice call is started, the image being photographed with the camera 60 of the own terminal is stopped from being transmitted, the camera 60 is stopped, the display 30 is stopped from displaying, and a transition is made to the state [4].

When the video call is ended in the state [2], the image being photographed with the camera 60 of the own terminal is stopped from being transmitted, the display 30 is stopped from displaying, the camera 60 is stopped, video call ending processing is performed, and a transition is made to the state [0].

In the state [3], if the face is successfully recognized based on the image being received from the communication counterpart terminal, the image being photographed with the camera 60 of the own terminal is transmitted to the communication counterpart terminal (restart image transmission), and a transition is made to the state [2].

If the image is no longer received from the communication counterpart terminal in the state [3], the display 30 is stopped from displaying, and a transition is made to the state [1].

In the state [3], when a change is made to the voice call by the own terminal manually or by the communication counterpart terminal through the bearer switching, the voice call is started, the camera 60 is stopped, the display 30 is stopped from displaying, and a transition is made to the state [4].

In the state [3], if the face cannot be recognized based on the image photographed with the camera 60 of the own terminal for a fixed time or longer, the display 30 is stopped from displaying, the camera 60 is stopped, the voice call is started, and a transition is made to the state [4].

When the video call is ended in the state [3], the display 30 is stopped from displaying, the camera 60 is stopped, video call ending processing is performed, and a transition is made to the state [0].

In the state [4], when a change is made to the video call by the own terminal manually or by the communication counterpart terminal through the bearer switching, the voice call is ended, the camera 60 of the own terminal is started up, the image photographed with the camera 60 of the own terminal is being transmitted, and a transition is made to the state [1].

In the state [4], when the voice call is ended, voice call ending processing is performed, and a transition is made to the state [0].

Next, the second image transmission control processing is described in detail with reference to flowcharts illustrated in FIG. 8A, FIG. 8B, FIG. 8C and FIG. 8D.

When the video call is started between the mobile phone terminal (A-side terminal) MT(A) used by the calling party and the mobile phone terminal (B-side terminal) MT(B) used by the called party, [S31] the photographing using the camera is started, and the photographed image is transmitted to the communication counterpart terminal involved in the video call. [S32] It is verified whether or not the image is being received from the communication counterpart terminal. If the image is being received from the communication counterpart terminal, the procedure advances to Step S33, and if not being received, the procedure advances to Step S40. [S33] The received image is displayed on the display 30 because the image is being received from the communication counterpart terminal.

[S34] It is verified whether or not the face is recognized based on the image received from the communication counterpart terminal. If the face can be recognized, the procedure advances to Step S35, and if the face cannot be recognized, the procedure advances to Step S37. [S35] It is verified whether or not the switching is to be performed to the voice call. If the switching is to be performed to the voice call, the procedure advances to Step S44, and if the switching is not to be performed to the voice call, the procedure advances to Step S36. [S36] It is verified whether or not the video call is to be ended. If the video call is to be ended, the procedure advances to Step S47, and if the video call is not to be ended, the procedure advances to Step S58.

[S37] The image photographed with the camera 60 of the own terminal is stopped from being transmitted to the communication counterpart terminal. [S38] It is verified whether or not the face can be recognized for the fixed time based on the image photographed with the camera 60 of the own terminal. If the face can be recognized, the procedure advances to Step S39, and if the face cannot be recognized, the procedure advances to Step S45. [S39] It is verified whether or not the switching is to be performed to the voice call. If the switching is to be performed to the voice call, the procedure advances to Step S45, and if the switching is not to be performed to the voice call, the procedure advances to Step S57.

[S40] The image is not being received from the communication counterpart terminal, and hence the display 30 is stopped from displaying. [S41] It is verified whether or not the image is being received from the communication counterpart terminal. If the image is being received from the communication counterpart terminal, the procedure advances to Step S50, and if the image is not being received from the communication counterpart terminal, the procedure advances to Step S42. [S42] It is verified whether or not the switching is to be performed to the voice call. If the switching is to be performed to the voice call, the procedure advances to Step S51, and if the switching is not to be performed to the voice call, the procedure advances to Step S43.

[S43] It is verified whether or not the video call is to be ended. If the video call is to be ended, the procedure advances to Step S49, and if the video call is not to be ended, the procedure advances to Step S41. [S44] The image photographed with the camera 60 of the own terminal is stopped from being transmitted to the communication counterpart terminal. [S45] The display 30 is stopped from displaying. [S46] The camera 60 is stopped.

[S47] The image photographed with the camera 60 of the own terminal is stopped from being transmitted to the communication counterpart terminal. [S48] The display 30 is stopped from displaying. [S49] The camera 60 is stopped. [S50] The image received from the communication counterpart terminal is displayed on the display 30. [S51] The image photographed with the camera 60 of the own terminal is stopped from being transmitted to the communication counterpart terminal.

[S52] The voice call is started. [S53] It is verified whether or not the switching is to be performed to the video call. If the switching is to be performed to the video call, the procedure advances to Step S55, and if the switching is not to be performed to the video call, the procedure advances to Step S54. [S54] It is verified whether or not the voice call is to be ended. If the voice call is to be ended, the procedure advances to Step S56, and if the voice call is not to be ended, the procedure advances to Step S52. [S55] The voice call ending processing is performed. [S56] The voice call ending processing is performed.

[S57] It is verified whether or not the video call is to be ended. If the video call is to be ended, the procedure advances to Step S48, and if the video call is not to be ended, the procedure advances to Step S32. [S58] It is verified whether or not the transmission of the own image is being stopped. If the transmission of the image is being stopped, the procedure advances to Step S59, and if the transmission of the image is not being stopped, the procedure advances to Step S32. [S59] The image photographed with the camera 60 of the own terminal starts to be transmitted to the communication counterpart terminal.

Third Image Transmission Control Processing

FIG. 9 illustrates a first outline of third image transmission control processing in time series.

This first outline of the third image transmission control processing indicates a case where the mobile phone terminal (A-side terminal) MT(A) used by the calling party has the above-mentioned second image transmission control processing function but the mobile phone terminal (B-side terminal) MT(B) used by the called party does not have the above-mentioned second image transmission control processing function.

In a state of No. 1, by bidirectionally transmitting/receiving pieces of image information (transmitting/receiving moving images) photographed with the camera 60 of the A-side terminal MT(A) and the camera 60 of the B-side terminal MT(B), the facial image is displayed on the display (LCD) 30 of the communication counterpart terminal.

This state of No. 1 corresponds to the state [2] illustrated in the state transition diagrams of the second image transmission control processing illustrated in FIG. 7A, FIG. 7B, FIG. 7C and FIG. 7D. Further, in the state of No. 1, the A-side terminal MT(A) and the B-side terminal MT(B) repeat the processing of a loop that starts from Step S31 and returns to Step S32 through Steps S32, S33, S34, S35, S36, and S58 of the flowcharts illustrated in FIG. 8A, FIG. 8B, FIG. 8C and FIG. 8D.

In the state of No. 2, to which a transition is made from the state of No. 1, the subject other than B's face (here, automobile) is being photographed with the camera 60 of the B-side terminal MT(B). The A-side terminal MT(A) cannot recognize B's face based on the image received from the B-side terminal MT(B). In this case where the face cannot be recognized (face recognition NG), the A-side terminal MT(A) is controlled so as not to transmit the facial image photographed with the camera 60 of the A-side terminal MT(A) to the B-side terminal MT(B) (stop transmission).

This state of No. 2 corresponds to the states [1] and [3] illustrated in the state transition diagrams of the second image transmission control processing illustrated in FIG. 7A, FIG. 7B, FIG. 7C and FIG. 7D. Further, in the state of No. 2, the A-side terminal MT(A) repeats the processing of a loop that starts from Step S32 and returns to Step S32 through Steps S33, S34, S37, S38, S39, and S57 of the flowcharts illustrated in FIG. 8A, FIG. 8B, FIG. 8C and FIG. 8D. Further, the B-side terminal MT(B) repeats the processing of a loop that starts from Step S32 and returns to Step S41 through Steps S40, S41, S42, and S43 of the flowcharts illustrated in FIG. 8A, FIG. 8B, FIG. 8C and FIG. 8D.

In the state of No. 3, to which a transition is made from the state of No. 2, the subject other than A's face is being photographed with the camera 60 of the A-side terminal MT(A). In this case, the A-side terminal MT(A) comes to a state in which the face cannot be recognized based on the image photographed with the camera 60 of the A-side terminal MT(A). Therefore, it is determined that the images are being stopped bidirectionally, and bearer switching to the voice call is performed, to thereby set a voice-call-in-progress state represented by the state of No. 4.

This state of No. 3 corresponds to a transient state [*] that transitions from the state [3] to the state [4] in the state transition diagrams of the second image transmission control processing illustrated in FIG. 7A, FIG. 7B, FIG. 7C and FIG. 7D. Further, the state of No. 4 corresponds to the state [4] illustrated in the state transition diagrams of the second image transmission control processing illustrated in FIG. 7A, FIG. 7B, FIG. 7C and FIG. 7D.

Between No. 3 and No. 4, the A-side terminal MT(A) repeats the processing of a loop that starts from Step S38 and returns to Step S52 through Steps S45, S46, S52, S53, and S54 of the flowcharts illustrated in FIG. 8A, FIG. 8B, FIG. 8C and FIG. 8D. Further, the B-side terminal MT(B) repeats the processing of a loop that starts from Step S42 and returns to Step S52 through Steps S51, S46, S52, S53, and S54 of the flowcharts illustrated in FIG. 8A, FIG. 8B, FIG. 8C and FIG. 8D.

FIG. 10 illustrates a second outline of the third image transmission control processing in time series.

This second outline of the third image transmission control processing indicates a case where the A-side terminal MT(A) has the above-mentioned second image transmission control processing function but the B-side terminal MT(B) does not have the above-mentioned second image transmission control processing function.

In a state of No. 1, by bidirectionally transmitting/receiving pieces of image information (transmitting/receiving moving images) photographed with the camera 60 of the A-side terminal MT(A) and the camera 60 of the B-side terminal MT(B), the facial image is displayed on the display (LCD) 30 of the communication counterpart terminal.

This state of No. 1 corresponds to the state [2] illustrated in the state transition diagrams of the second image transmission control processing illustrated in FIG. 7A, FIG. 7B, FIG. 7C and FIG. 7D. Further, in the state of No. 1, the A-side terminal MT(A) and the B-side terminal MT(B) repeat the processing of a loop that starts from Step S31 and returns to Step S32 through Steps S32, S33, S34, S35, S36, and S58 of the flowcharts illustrated in FIG. 8A, FIG. 8B, FIG. 8C and FIG. 8D.

In the state of No. 2, to which a transition is made from the state of No. 1, the subject other than A's face (here, flower) is being photographed with the camera 60 of the A-side terminal MT(A). On the B-side terminal MT(B), the image transmission control function according to the embodiment is not installed, and hence the image of the subject other than A's face received from the A-side terminal MT(A) is displayed as it is, and the image of B's face photographed with the camera 60 of the B-side terminal MT(B) is transmitted to the A-side terminal MT(A) as it is.

This state of No. 2 of the A-side terminal MT(A) corresponds to the state [2] illustrated in the state transition diagrams of the second image transmission control processing illustrated in FIG. 7A, FIG. 7B, FIG. 7C and FIG. 7D. Further, in the state of No. 2, the A-side terminal MT(A) repeats the processing of a loop that starts from Step S31 and returns to Step S32 through Steps S32, S33, S34, S35, S36, and S58 of the flowcharts illustrated in FIG. 8A, FIG. 8B, FIG. 8C and FIG. 8D.

In the state of No. 3, to which a transition is made from the state of No. 2, the subject other than B's face (here, automobile) is being photographed with the camera 60 of the B-side terminal MT(B). In this case, the A-side terminal MT(A) cannot recognize the face based on the image received from the B-side terminal MT(B), and hence the A-side terminal MT(A) is controlled so as not to transmit the image photographed with the camera 60 of the A-side terminal MT(A) to the B-side terminal MT(B) (stop transmission).

This state of No. 3 of the A-side terminal MT(A) corresponds to the state [3] illustrated in the state transition diagrams of the second image transmission control processing illustrated in FIG. 7A, FIG. 7B, FIG. 7C and FIG. 7D. Further, in the state of No. 3, the A-side terminal MT(A) repeats the processing of a loop that starts from Step S32 and returns to Step S32 through Steps S33, S34, S37, S38, S39, and S57 of the flowcharts illustrated in FIG. 8A, FIG. 8B, FIG. 8C and FIG. 8D.

In the state of No. 4, to which a transition is made from the state of No. 3, the subject other than A's face is being photographed with the camera 60 of the A-side terminal MT(A). In this case, the A-side terminal MT(A) comes to a state in which the face cannot be recognized based on the image photographed with the camera 60 of the A-side terminal MT(A). Therefore, it is determined that the images are being stopped bidirectionally, and bearer switching to the voice call is performed, to thereby set a voice-call-in-progress state represented by the state of No. 5.

This state of No. 4 corresponds to a transient state [*] that transitions from the state [3] to the state [4] in the state transition diagrams of the second image transmission control processing illustrated in FIG. 7A, FIG. 7B, FIG. 7C and FIG. 7D. Further, the state of No. 5 corresponds to the state [4] illustrated in the state transition diagrams of the second image transmission control processing illustrated in FIG. 7A, FIG. 7B, FIG. 7C and FIG. 7D.

Between No. 4 and No. 5, the A-side terminal MT(A) repeats the processing of a loop that starts from Step S38 and returns to Step S52 through Steps S45, S46, S52, S53, and S54 of the flowcharts illustrated in FIG. 8A, FIG. 8B, FIG. 8C and FIG. 8D.

Effect of Embodiment

According to the embodiment, it is possible to inhibit unnecessary transmission and visible display of a picked-up image to reduce power consumption. In addition, it is possible to effectively use communication resources.

Modified Example

The processing of the embodiment described above is provided as a computer-executable program, and can be provided by a recording medium such as a CD-ROM or a flexible disk or via a communication line.

An arbitrary plurality of or all the processes of the embodiment described above can be selected and combined to be carried out.

What is claimed is:

1. An information processing device, comprising:
an image pickup unit that picks up an image including a facial image of a speaker;
a transmission unit that transmits a picked-up image;
a reception unit that receives an image including a facial image picked up by a communication counterpart device;
a display unit that displays a received image;
a transmission control unit that inhibits transmission of the image including the facial image picked up by the image pickup unit included in an own device in a case where the facial image is not being picked up by the communication counterpart device;
a first control signal receiving unit that receives a first control signal transmitted from the communication counterpart device in the case where the facial image is not being picked up by the communication counterpart device; and
a second control signal receiving unit that receives a second control signal transmitted from the communication counterpart device in a case where the facial image is picked up by the communication counterpart device after the first control signal is transmitted,
wherein the case where the facial image is not being picked up by the communication counterpart device comprises a case where the first control signal is received,
wherein by using as a condition that the first control signal receiving unit has received the first control signal transmitted from the communication counterpart device, the transmission control unit inhibits the transmission of the image including the facial image picked up by the image pickup unit included in the own device, and
wherein the transmission control unit lifts the inhibition of the transmission of the image including the facial image picked up by the image pickup unit included in the own device by using as a condition that the second control signal is received.

2. The information processing device according to claim 1, further comprising: a face detection unit that detects that the facial image is included in the image picked up by the image pickup unit included in the own device; and a first control signal transmitting unit that transmits the first control signal when the face detection unit does not detect that the facial image is included in the picked-up image.

3. The information processing device according to claim 2, further comprising a second control signal transmitting unit that transmits the second control signal when the face detection unit detects that the facial image is included in the picked-up image after the first control signal is transmitted.

4. A non-transitory readable medium recorded with a program that causes an information processing device to execute processing comprising:
picking up an image including a facial image of a speaker;
transmitting the picked-up image;
receiving an image including a facial image picked up by a communication counterpart device;
displaying the received image;
inhibiting transmission of the image including the facial image picked up by the picking up in an own device in a case where the facial image is not being picked up by the communication counterpart device; and
receiving a first control signal transmitted from the communication counterpart device in the case where the facial image is not being picked up by the communication counterpart device;
receiving a second control signal transmitted from the communication counterpart device in a case where the facial image is picked up by the communication counterpart device after the first control signal is transmitted, and
lifting the inhibition of the transmission of the image including the facial image picked up by the picking up in the own device by using as a condition that the second control signal is received,
wherein the case where the facial image is not being picked up by the communication counterpart device comprises a case where the first control signal is received, and
wherein by using as a condition that the receiving the first control signal has received the first control signal transmitted from the communication counterpart device, the inhibiting inhibits the transmission of the image including the facial image picked up by the picking up in the own device.

* * * * *